(12) United States Patent
Deuber

(10) Patent No.: US 9,492,028 B2
(45) Date of Patent: Nov. 15, 2016

(54) BREWING MODULE

(71) Applicant: Luna Technology Systems LTS GMBH, Wallisellen (CH)

(72) Inventor: Louis Deuber, Richterswil (CH)

(73) Assignee: QBO COFFEE GMBH, Wallisellen (CH)

( * ) Notice: Subject to any disclaimer, the term of this patent is extended or adjusted under 35 U.S.C. 154(b) by 166 days.

(21) Appl. No.: 14/373,702

(22) PCT Filed: Jan. 25, 2013

(86) PCT No.: PCT/CH2013/000014
§ 371 (c)(1),
(2) Date: Jul. 22, 2014

(87) PCT Pub. No.: WO2013/110206
PCT Pub. Date: Aug. 1, 2013

(65) Prior Publication Data
US 2014/0348994 A1    Nov. 27, 2014

(30) Foreign Application Priority Data
Jan. 25, 2012 (EP) .................................... 12405010

(51) Int. Cl.
*A47J 31/40* (2006.01)
*A23F 5/26* (2006.01)
*A47J 31/36* (2006.01)

(52) U.S. Cl.
CPC .............. *A47J 31/407* (2013.01); *A23F 5/262* (2013.01); *A47J 31/3623* (2013.01);
(Continued)

(58) Field of Classification Search
CPC .................. A47J 31/407; A47J 31/3623; A47J 31/3633; A47J 31/3638; A47J 31/3695; A23F 5/262
See application file for complete search history.

(56) References Cited

U.S. PATENT DOCUMENTS 5,755,149 A * 5/1998 Blanc .................. A47J 31/3623
99/289 T
8,613,247 B2 * 12/2013 Deuber ............... A47J 31/3623
99/289 R
(Continued)

FOREIGN PATENT DOCUMENTS

CA    2793911    * 9/2011
CA    2800915    * 12/2011
(Continued)

OTHER PUBLICATIONS

English Translation for WO2010118545 published Oct. 2010.*
English Translation for FR 2723524 published Jul. 1996.*

*Primary Examiner* — Anthony Weier
(74) *Attorney, Agent, or Firm* — Rankin, Hill & Clark LLP

(57) ABSTRACT

A brewing module includes a support element, a first brewing module part and a second brewing module part that can be moved relative to the first brewing module part. The first brewing module part and the second brewing module part have a discharging device for discharging an extraction product from a capsule and an injector for introducing an extraction liquid into the capsule. In a supporting position with the brewing chamber open, the support element catches a capsule inserted via a defined insertion position, such that the capsule lies on the support element and on a support part of the first brewing module part after insertion. By closing the brewing chamber, the support element is moved away from the supporting position into a resting position, wherein
(Continued)

the capsule is simultaneously held by a gripping element of the first brewing module part and/or of the second brewing module part.

24 Claims, 14 Drawing Sheets

(52) U.S. Cl.
 CPC ......... *A47J 31/3633* (2013.01); *A47J 31/3638* (2013.01); *A47J 31/3695* (2013.01)

(56) References Cited

U.S. PATENT DOCUMENTS

| | | | | |
|---|---|---|---|---|
| 2006/0230941 | A1* | 10/2006 | Ryser | A47J 31/3633 99/275 |
| 2009/0117249 | A1* | 5/2009 | Ozanne | A47J 31/3628 426/590 |
| 2009/0199518 | A1* | 8/2009 | Deuber | A47J 31/3628 53/492 |
| 2009/0249961 | A1* | 10/2009 | Cheng | A47J 31/3638 99/289 R |
| 2009/0293736 | A1* | 12/2009 | Jarisch | A47J 31/3633 99/295 |
| 2010/0064899 | A1* | 3/2010 | Aardenburg | A47J 31/3633 99/295 |
| 2010/0192779 | A1* | 8/2010 | Tanner | A47J 31/3695 99/295 |
| 2010/0288132 | A1* | 11/2010 | Gavillet | A47J 31/3628 99/295 |
| 2011/0000377 | A1* | 1/2011 | Favre | A47J 31/3628 99/289 R |
| 2013/0220138 | A1* | 8/2013 | Deuber | A47J 31/3695 99/289 R |

FOREIGN PATENT DOCUMENTS

| | | | |
|---|---|---|---|
| EP | 1495702 | | 1/2005 |
| FR | 2723524 | * | 2/1996 |
| FR | 2723524 | * | 7/1996 |
| WO | 95/17121 | | 6/1995 |
| WO | 2008/004116 | | 1/2008 |
| WO | WO2010118545 | * | 10/2010 |
| WO | WO2011042401 | * | 4/2011 |
| WO | WO2011045175 | * | 4/2011 |
| WO | WO2011067264 | * | 6/2011 |
| WO | 2012/045184 | | 4/2012 |

* cited by examiner

BREWING MODULE

BACKGROUND OF THE INVENTION

1. Field of the Invention

The invention generally relates to extraction apparatuses for preparing beverages or the like from an extraction material, for example ground coffee, contained in a capsule and, more particularly, to a brewing module for an extraction apparatus and also to an extraction apparatus with such a brewing module.

2. Description of Related Art

Extraction apparatuses for preparing beverages or the like from an extraction material present in a portion pack are known, for example, as coffee or espresso machines. In many corresponding systems, the portion packs are formed as capsules in which the extraction material is, for example, sealed in an airtight manner. For the extraction, the capsule is pierced, for example on two mutually opposite sides. On the first side, an extraction liquid—generally hot water—is then introduced. On the second side, the extraction product is discharged from the capsule. This takes place in what is referred to as a brewing module. Such a brewing module has a brewing chamber in which the capsule is accommodated. Brewing modules in which the capsule is placed into the brewing module and the brewing chamber is closed, for example, by way of an operating lever are particularly popular, wherein, on renewed opening of the brewing chamber after the brewing operation, the capsule is automatically removed from the brewing chamber and ejected into a capsule container. Such brewing modules with automatic capsule ejection are generally designed as horizontal brewing modules, i.e. the capsule is inserted from above, the closing of the brewing chamber involves a horizontal relative movement of two brewing chamber parts, the brewing liquid flows substantially horizontally, and the capsule container is formed below the brewing chamber.

The publications EP 1 721 553, EP 1 646 305, EP 1 495 702, WO 2008/004116 and WO 2008/014830 show examples of apparatuses with horizontal brewing chambers. All of the apparatuses are intended for capsules which are rotationally symmetrical about the horizontal axis. The capsule is placed into an intermediate position in which a peripheral collar of the capsule is held by holding devices specially provided for this purpose—for example, pivot arms arranged at the side of the capsule. The two brewing chamber parts are subsequently displaced relative to each other in order to push the capsule into a brewing chamber. As a result, the capsule is pushed from the intermediate position into a brewing position, with the connection between the holding devices and the collar also being released. After the brewing operation, the brewing chamber is opened, and the capsule—no longer held by the holding devices—drops into the capsule container.

Although some of the concepts in the above documents differ (horizontal displacement or tilting movement between first and second position, shape of the capsule, etc.), a common feature of the documents is that the peripheral collar of the capsule and holding devices provided specially therefore are required for the holding in the intermediate position and/or the guiding into the ejection position. This has the disadvantage that there are few degrees of freedom in the configuration of the capsule; in addition, brewing chamber and holding and release mechanisms have to be configured in a relatively complicated and therefore elaborated manner.

WO 2005/060801, WO 2007/016977 and U.S. Pat. No. 6,182,554 present brewing modules in which the capsule is to be inserted into a capsule holder with a cavity, wherein the shape and volume of the cavity are precisely coordinated with the capsule. When the brewing chamber is closed, the capsule holder is pivoted, and a closure part is pressed against capsule holder and capsule, with the capsule being pierced. Also in these solutions, the peripheral collar of the capsule and the cup shape thereof have a central function. The collar is imperative for sealing of the injection side from the extraction side, and the cup shape is a prerequisite to the simple operability in the solutions. WO 2010/043451 also presents a brewing module in which the capsule, guided on the collar after being inserted, is held in an intermediate position.

WO 2010/118545 presents a brewing module which has a first brewing module part and a second brewing module part which is linearly displaceable relative to the first brewing module part, wherein the first brewing module part forms a capsule receptacle with a support and a lateral guide. The capsule is inserted before the brewing chamber is closed such that the capsule, guided by the lateral guide, rests directly on the support, wherein, after the brewing chamber is closed, the support and the lateral guide thereof form part of the brewing chamber; that is to say, the insertion takes place directly into a part of the brewing chamber. This solution has the advantage, inter alia, of permitting a very compact design with small displacement distances, that the capsule shape can be selected virtually as desired and that the peripheral collar of the capsule is optional and is not necessary. However, in the case of brewing systems which operate at high brewing pressure, suitable sealing systems which reliably prevent the brewing liquid introduced into the capsule from flowing past the capsule can be difficult to accommodate.

The document FR 2 723 524 presents a coffee machine for preparing coffee by way of "pods" (flat portion packages in which the extraction material is held in a water-permeable filter material and which do not have to be pierced). According to FR 2 723 524, after the insertion and before the closing of the brewing chamber, the pods are held by an element which can be tilted away. So that the pod remains in the designated upright position, the pod has to remain guided along the lateral collar until the brewing chamber closes. WO 95 17121 presents a comparable solution—likewise for pods—with a support element which is displaceable linearly in the axial direction.

BRIEF SUMMARY OF THE INVENTION

Taking the prior art as the starting point, it is an object of the invention to provide a brewing module for an extraction apparatus, for example a coffee machine, for preparing portions of a beverage or other extraction product from an extraction material packaged in a capsule, which brewing module overcomes the disadvantages of existing brewing modules and permits a simple and compact construction and a high degree of flexibility in the capsule design. The brewing module is intended to be suitable in particular for horizontal installation and preferably also for high brewing pressures of above 10 bar, for example up to 20 bar.

According to a first aspect, the brewing module has a first brewing module part and a second brewing module part which is movable relative thereto, wherein the first and the second brewing module part form a discharge device for discharging an extraction product from the capsule and an injector for introducing an extraction liquid into the capsule.

In a closed position (the first and second brewing module part are, for example, "together"), a brewing chamber which at least partially surrounds the capsule during the brewing operation is closed.

Furthermore, the brewing module according to the first aspect has a support element. The support element is designed in such a manner that, in a support position when the brewing chamber is open, the support element captures a capsule which has been inserted via the defined insertion position, and therefore the capsule, after having been inserted, rests on the support element. By closure of the brewing chamber, the support element is displaced away from the support position into an inoperative position, wherein the capsule is held at the same time by a gripping element of the first brewing module part and/or of the second brewing module part, and wherein the movement from the support position into the inoperative position takes place in a direction which is different from the direction of movement of the second brewing module part relative to the first brewing module part during the closure of the brewing chamber. The movement takes place, for example, as a pivoting movement downward or in a lateral direction with respect to the axial direction.

In known horizontal brewing modules, the capsule, after being inserted, is held in an intermediate position by the peripheral collar of the capsule being guided in a guide slot. Firstly, the weight of the capsule is held here by the means in which the guide slot is formed. Secondly, the guide slot also has to absorb the torque which arises because the peripheral collar does not lie in the region of the center of gravity of the capsule, but rather at one end thereof (with respect to the axial, approximately horizontal direction). For this reason, the peripheral collar is not only required in the prior art for the seal, but also is indispensible for the holding in the intermediate position after the capsule has been inserted and before the brewing chamber is closed.

In contrast to the known prior art, in the case of the generally horizontal brewing module according to the invention, the capsule, after being inserted in the open position of the brewing chamber, is not simply held on the peripheral collar, but rather lies firstly on the support element and secondly on a support portion of the first brewing module part. The support element here forms a base which comes to lie under the actual capsule body. The support element—together with the support portion of the first brewing module part—forms a support which supports the center of gravity of the capsule, i.e., in the open state of the brewing module, the capsule rests entirely on the support without, as in the prior art, guide devices having to absorb a torque (i.e. the brewing module can be free from guide devices, for example guide grooves, etc., which, after the capsule has been inserted, absorb a torque exerted by the capsule resting thereon). Before the brewing chamber is closed, the capsule rests in equilibrium on the support formed by support element and support portion at the position defined by the insertion in such a manner that a possible torque does not have to be absorbed by guide devices so that the capsule does not tilt away. For these reasons, capsules can also be used without the stiff peripheral collar.

In the open position of the brewing chamber, the capsule can rest at a peripheral point with respect to the axial direction on the support element and, on the opposite side, on a support portion of the brewing module. The support center of gravity on the support element can be located away from the two axial ends of the capsule, for example by at least 10% of the axial extent. The support center of gravity on the support as a whole (i.e. the support consisting of support element and support portion of the brewing module part) is, for example, approximately in the center of the capsule and, for example, at least 30% away from the two axial ends of the capsule.

An empty intermediate space can optionally be present between support element and support portion. It is advantageous in each case that support element and support portion form two support locations at different axial positions.

In addition, the support element can extend over the entire width of the capsule, and therefore the orientation of the capsule is completely defined by support element and support portion.

As an alternative thereto, the support element can also support only part of the width of the capsule. According to one exemplary embodiment, the support element has two support element parts which each engage from one side under a region of the capsule.

That portion of the capsule which rests on the support element is, for example, of planar design, i.e. it forms a part of the capsule wall which separates the capsule interior (filled with the extraction material) and the capsule exterior. By way of the support element, the capsule wall, for example, is pressed against a capsule interior. The fact that the capsule wall is pressed against a capsule interior means that there is no dimensionally stable stiffening per se and no supporting counter element at the location of the support element, but rather that the capsule wall is, on the contrary, pressed virtually against the capsule filling by the support element.

Particularly, the support element can be designed in such a manner that a collar-free capsule, for example cube-shaped or cylindrical or conical capsule, is also held by the support.

The peripheral weld seam which is unavoidable in the use of a cylindrical or conical capsule can rest, for example, on the support portion, with the position of the weld seam then being correspondingly adapted.

As already mentioned, by the closure of the brewing chamber the support element is displaced away from the support position into an inoperative position. The support element here can be subject in particular to a movement downward. For example, the support element can be formed as a bow which forms a support portion and which is pivotable about a pivot axis in such a manner that, during a pivoting movement, the support portion is moved away downward from the capsule (or in the reverse direction, during the opening of the brewing chamber).

In one embodiment, the support element can also be of multi-part design, in particular by way of a plurality of support element parts which are movable in the same or different directions.

A pivoting movement toward the side or a translation movement, for example obliquely downward, are also conceivable. In the case of a multi-part support element, it is possible, for example, for two support element parts to be pivotable in different directions, for example toward one side in each case.

The fact that the movement toward the inoperative position takes place in a direction different from the movement of the second brewing module part relative to the first brewing module part makes a compact arrangement combined with a functionally capable capsule seal possible. It has been shown that, in contrast to a displacement movement in the direction of movement of the second brewing module part also by the first brewing module part, sealing devices for sealing the pierced capsule during the brewing operation can be placed in such a manner that they have the effect that the brewing liquid discharged from the capsule passes completely into the discharge device (and does not, for example, drip downward). Furthermore, if the need arises, it is also possible to seal off the brewing chamber parts from one another, and therefore the brewing chamber is tight to the outside, which is explained in more detail below.

The movement of the support element by the closure of the brewing chamber preferably takes place mechanically. In particular, the movement is brought about by the relative movement of the second brewing chamber part to the first brewing chamber part itself. The different direction of movement of the support element movement can then be brought about, for example, by deflecting and/or guiding devices which convert a movement of the second brewing chamber part in a first direction into a movement of the support element in a second direction.

The deflecting and/or guiding devices can be brought about, for example, by a mounting of the support element in a manner pivotable about a fixed axis of rotation, or, alternatively, by guiding devices predetermining the translation direction.

The support element can be fastened pivotably or movably in another manner in particular to a stationary, non-moving brewing module part (for example the first brewing module part, in particular the discharge device) or to another object which is stationary relative to the first brewing module part, for example a module housing. There is an operative connection here with the second brewing module part in that the movement thereof moves the support element.

The reverse—i.e. fastening the support element to the moving brewing module part—is also readily conceivable.

When the brewing chamber is opened, the support element is moved back into the support position only when the brewing chamber is opened to a certain predetermined extent—for example when it is completely opened. In particular, the predetermined extent is selected, for example, in such a manner that the brewing chamber is opened further when the support element moves into the support position during the opening operation than when the support element moves away from the support position during the closing operation (hysteresis behavior).

In one embodiment, when the brewing chamber is closed, the support element is moved counter to a spring force and latches such that, when the brewing module is reopened, the support element initially remains in the inoperative position and the capsule can drop into the capsule container. The support element is released by the opening of the brewing chamber, for example only by the complete opening.

It is possible, for example, for there to be a retaining element which, after the brewing chamber is closed, holds the support element in the inoperative position, for example counter to a spring force. The support element is moved back into the support position only by complete opening of the brewing chamber. This can be undertaken, for example, by the fact that the retaining element is optionally displaced by a release portion of the moving brewing module part in such a manner that a latching connection or other connection to the support element is released and the latter can pass back into the support position. The operative connection between retaining element and moving brewing module part can be a direct operative connection (for example, by the release portion striking against the retaining element) or an indirect operative connection via a separate release element.

A further possibility consists in mounting the support element in such a manner that the support element is bistable because of the action of at least one spring. For example, when the brewing chamber is closed, the support element can be moved counter to a spring force until the support element is moved beyond a dead center position, whereupon the support element is moved further, owing to the spring force, until the support element is in contact with a stop. When the brewing module is reopened, the support element is moved back again beyond the dead center. A corresponding resetting mechanism can be designed here in such a manner that it only becomes effective if the brewing module is opened to such an extent that the capsule has been or is ejected and can drop downward.

For example, a bow which serves as the release element and is actuated by the second brewing module part during the opening thereof can be dimensioned in such a manner that the bow is moved only over the final portion of the distance (for example at maximum over the final third) during the opening. Furthermore, a suitable damping device which prevents the support element from rapidly snapping back into the support position can be present.

As an alternative, the deflecting and/or guiding devices can be designed in the manner of a slotted guide mechanism. Such a slotted guide mechanism can be formed, for example, in the moving (second) brewing module part, whereas the support element is fastened pivotably or movably in another manner to the other brewing module part and has a guided element engaging in the slotted guide mechanism—or vice versa.

The desired hysteresis behavior can be brought about, for example, by the slotted guide mechanism having a first guide groove and a second guide groove. During the closing operation, a guided element (for example a guide pin) is guided in the first guide groove which runs in such a manner that the support element remains in the support position until the brewing chamber is virtually closed, and the support element is only then displaced into the inoperative position, i.e. only when the brewing chamber is closed or shortly before the latter is completely closed. While the brewing chamber is open, the guided element is then guided in a second guide groove which is located in such a manner that the support element remains in the inoperative position until the brewing chamber is virtually entirely opened and the capsule is ejected. The complete opening then causes the support element to be displaced back again into the support position.

The support element can have lateral guides which are coordinated with the capsule geometry in such a manner that the capsule is positioned by the guides in a desired precision with respect to lateral directions (horizontal directions transversely with respect to the axis). Such lateral guides can be designed as projections/webs protruding upward from the support surface on both sides; a slightly conical configuration with a receptacle opening upward for the capsule may be expedient.

The gripping element which supports the capsule when the support element moves away can be designed, for example, as an embracing seal of the first and/or of the second brewing module part. The embracing seal can have, in particular, a sealing collar which embraces the capsule in a positioning and holding manner. In the region of the sealing collar, the seal can embrace the capsule along a peripheral surface and the elasticity of the seal enables the latter to be pressed against the capsule wall in such a manner that the capsule is held by the seal.

By way of the cooperation of the support and the embracing, in particular flexible, elastically deformable, e.g. rubber-elastic and/or elastomeric seal, the capsule can be optimally centered for the brewing operation. This is expedient in particular whenever the capsule is not held and positioned by a lateral guide, which acts on a collar, during the entire insertion operation and thereafter, and therefore a certain residual inaccuracy in the capsule position has to be expected.

For the sealing function, one or more peripheral sealing lips or sealing beads can be present on the sealing collar. At least one sealing lip and/or sealing bead can be designed in such a manner that they/it bear/bears against a surface of the capsule in the manner of a line or strip and press/presses the capsule wall against a capsule interior. Particularly, the seal can optionally have a plurality of peripheral sealing lips and/or sealing beads which, owing to the elasticity thereof, press the capsule wall against a capsule interior, wherein a depression is arranged in each case between consecutive sealing lips or sealing beads in such a manner that a peripheral cavity is formed between the consecutive sealing lips or sealing beads and the capsule in the operating state. It can also be provided in addition or alternatively that the seal seals both against an end surface and against a peripheral surface. For this purpose, at least one of the peripheral sealing lips or sealing beads can be pressed against an end surface of the capsule and at least one of the peripheral sealing lips or sealing beads can be pressed against a peripheral surface.

Capsule seals can be present on both sides, i.e. on the part of the injector and on the side of the discharge device. In various embodiments, the injector-side sealing collar is more expanded and/or the injector-side seal has more sealing lips than the extraction-side seal or there is no elastomer seal at all on the extraction side. Therefore, in general in these embodiments, the capsule is also held with a greater frictional force on the injector side than on the extraction side. In combination with arrangements in which the injector forms the movable brewing module part, this has the advantage that, when the brewing chamber is opened, the capsule is first of all moved together with the injector. A release from the embracing action of the injector-side seal can be undertaken, for example, by take-off elements, as will be discussed in more detail below.

The capsule seal(s) and/or optionally the brewing chamber seal described below will generally be made from a flexible, elastically deformable, in particular rubber-elastic and/or elastomeric material.

As in the embodiments described below, in the case of the brewing module, the first brewing module part can form the discharge device and the second brewing module part can form the injector. Alternatively thereto, the reverse can also be the case, i.e. the first brewing module part forms the injector and the second the discharge device. Even configurations in which the discharge device and the injector are both formed by the same brewing module part are conceivable, with it then being possible for the other brewing module part to have in particular the function of exerting a compressive force against the capsule and/or of sealing.

The discharge device and the injector are preferably arranged opposite each other and have, for example, a discharge plate with at least one piercing point protruding from the plate into the brewing chamber, or an injector plate, likewise with at least one injector point protruding from the plate into the brewing chamber. The piercing points are designed, for example, for piercing thermoformed plastics capsule walls, for example made from polypropylene with, for example, a thickness of between 0.2 mm and 0.4 mm, for example between 0.25 mm and 0.35 mm; as such, they differ markedly from piercing points for aluminum capsules. However, piercing devices for capsule wall materials other than thermoformed plastics may also be present.

Furthermore, although a peripheral collar of the capsule is possible, as before, the collar is no longer necessary. On the contrary, the capsule receptacle can be configured arbitrarily, in a manner forming a support, in accordance with the shape of the capsule.

Capsule shapes without peripheral collars are preferred. As a consequence thereof, capsule shapes which are no longer stiffened anisotropically by a peripheral collar, which permits more degrees of freedom, are also suitable.

According to one embodiment, the brewing chamber is designed, for example, for receiving a capsule which, in contrast to the prior art, does not expand conically to the discharge or injector side, but rather a capsule which is, for example, cube-shaped or cuboidal. Cuboidal or cube-shaped is understood here as a shape which does not deviate from the geometrically exact shape of a cuboid or cube to such an extent that it would be functionally very different; for example, it includes the shape of a truncated pyramid with a rectangular or square base area, wherein the side surfaces which adjoin the base area are inclined in relation to the perpendicular to the base area by only a small angle of inclination $\alpha$ of, for example, at most 2°, preferably at most about 1°. The cuboid or cube shape excludes a peripheral collar which protrudes from the capsule body in the plane of an end surface and is provided for holding the capsule in guide slots. The cuboidal or cube-shaped capsule may nevertheless comprise peripheral borders created during production (for example a welding bead) which protrude laterally, for example, by a maximum of 1.5 mm or 1 mm, or less, and which are offset, for example, from an end surface plane.

In order to close the brewing chamber, the second brewing module part can be movable linearly along an axial direction—i.e. in a translatory manner or substantially translatory manner—relative to the first brewing module part. A pivoting movement of the brewing module parts relative to each other is not excluded, but is generally unnecessary. Particularly, the capsule is preferably not pivoted when the brewing chamber is closed, i.e. the orientation of the capsule is substantially retained when the brewing chamber is closed.

In one embodiment, the brewing module can be designed in such a manner that the capsule substantially does not move—except for an axial displacement about approximately the length of a piercing point for piercing the capsule—when the brewing chamber is closed. Particularly, the brewing module is designed in such a manner that, when the brewing chamber is closed, the capsule is not tilted, but rather the orientation of the capsule is maintained.

According to one embodiment, the support and, for example, the entire capsule receptacle or the entire brewing module is tilted in relation to the horizontal; the support is inclined downward toward the first brewing module part. This means that a fastening of the brewing module part in the coffee machine is designed in such a manner that the tilting or inclination is present if the coffee machine is placed as directed on a horizontal base. For this purpose, the brewing module can have, for example, a fastening element which is connected to a brewing module frame in such a manner that the inclination of the brewing module is present. Alternatively, a brewing module housing can be shaped in such a manner that the inclination is achieved. The inclination of the axis of injector and discharging device toward the horizontal is preferably between 2° and 15° or between 2° and 10°, or between 3° and 7°. In the case of a substantially cube-shaped capsule, this means at the same time an inclination of the horizontal axis of symmetry of the capsule to the horizontal by between 2° and 15° or between 2° and 10°, preferably between 3° and 7°.

The brewing chamber preferably completely surrounds the capsule, i.e. the capsule receptacle and the second brewing module part have elements which correspond to one another in a precisely fitting manner and, in the closed position, together form the brewing chamber. The walls in the axial direction (with respect to the guiding of the brewing liquid and/or the direction of movement of the relative movement of the brewing module parts) form, for example, an injector plate with at least one injector point protruding from the plate into the brewing chamber, and a discharge plate, likewise with at least one piercing point protruding from the plate into the brewing chamber. The upper, lower and lateral walls are formed by corresponding, mutually adjoining wall parts of the first and second brewing module part. The wall parts formed by the first brewing module part and the wall parts formed by the second brewing module part can be sealed in relation to one another in the closed position, for example by way of a peripheral shaped seal. The seal can have, for example, a lip seal which is fastened to one of the brewing module parts and, when the brewing chamber is closed, strikes against a surface of the other brewing module part. A brewing chamber sealed in such a manner enables the extraction apparatus or the brewing module to be rinsed without a capsule having to be put in—which is a significant advantage for the user. However, this does not exclude the use of a rinsing capsule or spacer capsule during the rinsing or cleaning operation—with the brewing chamber sealed or not completely sealed.

In contrast to the prior art, embodiments with a brewing chamber completely surrounding the capsule and with brewing chamber parts which are sealed off from one another have a two-stage seal. A first sealing stage is formed by the capsule seal(s) which embraces/embrace the capsule and prevent the introduced extraction liquid or the discharged extraction product from flowing past the capsule. The first sealing stage seals off the capsule from the injector or from the discharge device. The second sealing stage seals off the brewing module parts from each other. It can firstly serve for supplemental sealing during the brewing operation. Secondly, it can serve, as mentioned, for the sealing during a rinsing operation.

The holding of the capsule in the brewing chamber by a peripheral seal, optionally in combination with sealing of the brewing chamber, has a further significant advantage over embodiments in which a peripheral collar of the capsule is held. This is because substantial manufacturing tolerances are possible, i.e. the accuracy of the positioning of the brewing module parts relative to one another does not have to be more precise than a tenth of a millimeter; on the contrary, the tolerance may be, under some circumstances, several tenths of a millimeter. The holding of the capsule by a peripheral seal or peripheral seals can absorb the tolerances here.

The procedure according to the first aspect first of all permits a very compact construction, since the capsule can be configured without a collar and, as a result, the brewing chamber also does not have to have any corresponding receptacle and holder for a collar.

In embodiments of the first aspect of the invention and optionally also independently thereof according to a second aspect of the invention, the brewing module can have movable capsule take-off elements.

Particularly, holding devices of the second brewing module part—for example, the gripping element, in particular the capsule seal with the peripheral sealing collar—can initially move the capsule together with the second brewing module part when the brewing chamber is opened, and, when the brewing chamber is opened further, the take-off elements then automatically come into engagement with the capsule and prevent the capsule from being moved further with the second brewing module part.

The capsule take-off elements are designed, for example, as parts (wings) which protrude horizontally radially inward from the sides toward the capsule and can be folded over away from the movable brewing module part and outward. The folding away from the movable brewing module part can be undertaken by the movable brewing module part and counter to a spring force, for example when the brewing chamber is closed.

When the brewing chamber is opened after the brewing process—in this state, the capsule often has a slightly larger extent in radial directions than before the brewing process because of the high pressures and temperatures acting on the capsule from the inside during the brewing process—the take-off elements become jammed/clamped to the capsule or strike against a reinforcement or a collar of the capsule and prevent the capsule from moving together with the movable brewing module part.

The holding back of the capsule by the take-off elements can be brought about, for example, in the following ways.

Friction: the force with which the take-off elements bear against the capsule brings about a frictional resistance against a displacement of the capsule relative to the inside edges of the take-off elements.

Clamping: the take-off elements and the capsule are dimensioned in such a manner that the capsule prevents the take-off elements from being completely folded back. Also on account of friction, the inside edges of the take-off elements are pressed into the capsule interior during the further retraction of the capsule and thus bring about a clamping which opposes a further retraction of the capsule.

Contact with a reinforcement or the like of the capsule. The capsule can have, for example, a peripheral weld seam or the like which forms a local reinforcement or a slightly protruding feature. A peripheral collar of the type known per se can also form such a reinforcement. The positioning of the take-off elements is such that the take-off elements bear against the capsule on the injection side of the reinforcement when the brewing chamber is opened and that the reinforcement cannot be pulled past the take-off elements.

Combinations of in each case two or all three of these possibilities and also other variants and combination therewith are also conceivable (with friction being included in any case in the clamping approach).

Advantageous features of the brewing module according to the first aspect—for example in conjunction with the seal embracing the capsule and/or with the brewing chamber seal—can also be realized in embodiments of the brewing module according to the second aspect.

As an alternative to take-off elements according to the second aspect, the brewing module can also have at least one ejector. When the brewing chamber is opened or closed, such an ejector is moved in an approximately axial direction relative to the brewing module part in which the capsule remains suspended when the brewing module is opened. In embodiments with an injection-side capsule seal embracing the capsule, the at least one ejector is moved relative to the injector, i.e. when the brewing chamber is opened/closed, specifically in such a manner that, when the brewing chamber is opened, the ejector ejects the capsule from the injector, i.e. optionally also from the seal embracing the capsule.

The ejector can be mounted in an axially displaceable manner, for example, in the corresponding brewing module part (for example injector) and, in the manner of a piston, can eject the capsule after the brewing process.

If the corresponding brewing module part is the brewing module part which moves relative to the housing during the opening/closing, the ejector can be mounted, for example, in a manner fixed on the housing such that it does not participate in the opening or closing movement.

However, it is often particularly advantageous if the ejector participates with the relative movement of the corresponding brewing module part relative to the other brewing module part, but by a reduced distance. For example, provision may be made for the ejector to be moved by the actuation of the operating lever, but, for example, by a shorter distance. This can be brought about, for example, in the event of actuation by an operating lever by a connecting rod which moves the ejector being fastened closer to the pivot axis of the operating lever than the corresponding connecting rod for the moving brewing module.

An extraction apparatus, in particular a coffee machine, with one of the abovementioned brewing modules according to the first or the second aspect, is conceivable.

Another embodiment of the invention according to the first aspect thereof is a method for brewing a brewed beverage using a capsule. This is carried out, for example, by a brewing module and an extraction apparatus of the above-described type and can comprise the following steps:

inserting a portion capsule with an extraction material into an open chamber of a brewing module—for example by a positioning insertion opening in such a manner that the portion capsule at least partially rests on a support element, which is in a support position;

closing the brewing chamber by movement of a second brewing module part relative to a first brewing module part in such a manner that, by way of a movement in a direction different from the direction of movement of the second brewing module part relative to the first brewing module part, the support element is moved away from the support position into an inoperative position, and the capsule is pierced at least by piercing points of an injector formed by the first and/or the second brewing module part, as a result of which introducing openings arise in the capsule;

introducing an extraction liquid into the capsule through the introducing openings (for example hot water with the use of a pump and a non-return valve);

discharging the extraction liquid from the capsule through discharge openings which have been produced by piercing points of a discharge device formed by the first and/or the second brewing module part;

subsequent to the discharging, opening the brewing chamber by movement of the second brewing module part relative to the first brewing module part until the capsule drops downward out of the open brewing chamber; and continuing the opening of the brewing chamber until the moving back of the support element into the support position is brought about.

BRIEF DESCRIPTION OF THE DRAWINGS

Exemplary embodiments of the invention are described below with reference to drawings. In the drawings, the same reference numbers refer to identical or analogous elements.

The drawings show partially mutually corresponding elements differing in size from figure to figure. In the drawings.

DETAILED DESCRIPTION OF THE INVENTION

Figure 1:
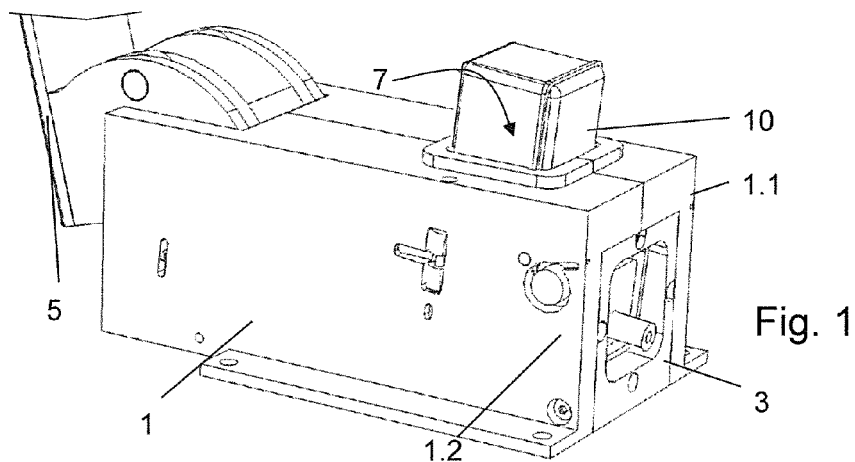
FIG. 1 is a view of a brewing module according to the invention in the capsule insertion position.

The brewing module according to FIGS. 1-6 has, guided in an outer housing 1, a discharge device 3 and an injector 4. Discharge device 3 and injector 4 are displaceable relative to each other by pivoting of the operating lever 5. For this purpose, the operating lever is pivotable about a rotary pin 6 which is present on the outer housing 1 or is held by the latter. In the embodiment shown, the injector 4 is displaceable downward in the direction of the discharge device 3 by a pivoting movement of the operating lever 5 while the discharge device is immovable relative to the outer housing 1.

Figure 2:
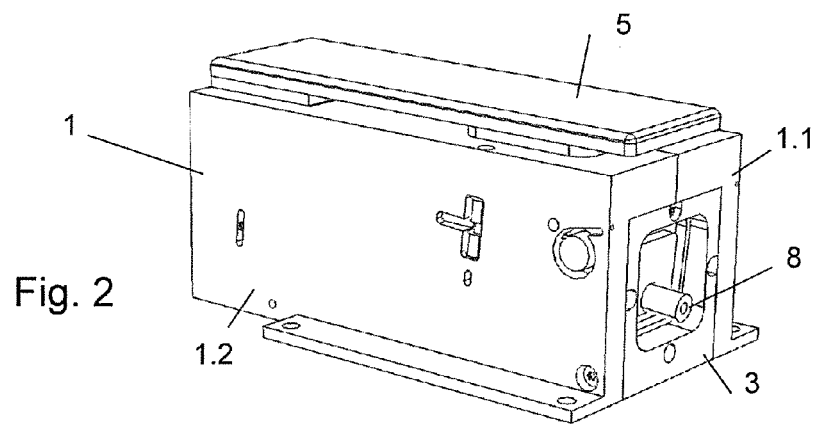
FIG. 2 is a view of the brewing module according to FIG. 1 in the closed position.

The outer housing 1 can be composed, as the exemplary embodiment illustrated, of two half shells 1.1, 1.2, as is seen in FIGS. 1 and 2. The half shells 1.1, 1.2 can be shaped on the inside in such a manner that they receive the parts mounted in the housing—for example the discharge device or the slidingly mounted injector—in a positioning manner. The parts can thus, under some circumstances, even be mounted without separate fastening devices (screws or the like), apart from, of course, screws (or similar) which fasten the two half shells to each other.

In the operating state, the brewing module serves as a horizontal brewing module of a coffee machine which, in addition to the brewing module, has a water tank, a water heating device (for example continuous water heater) and a pump for supplying brewing water to the injector 4. The corresponding supply channels 18 and possibly a non-return valve, etc., of the injector can be formed as known per se; they are not the subject matter of the invention and are not described in more detail here. In addition, the injector has at least one piercing point 12 with an associated supply opening, and therefore the capsule can be pierced and supplied with the extraction liquid through the supply opening. The coffee machine furthermore has, for example, a capsule container which is arranged below the brewing chamber and into which the capsule is automatically expelled after the brewing operation by raising of the operating lever.

The discharge device 3 is also provided with at least one piercing point 11 and an associated discharge opening 19. Furthermore, depending on the configuration, there is also an outlet line with which coffee (or the like) emerging from the outlet 8 of the discharge device is guided in such a manner that it runs into a cup deposited at the designated location. The channels leading to the outlet 8 are not described in detail here either.

In the exemplary embodiment shown, the injector 4 is constructed from four parts: an injector support as the first injector part 41 with a supply channel for delivering hot water and an injector plate holder which is held on the first injector plate and has injector-side piercing points 12, a capsule seal 43 and an injection-side brewing chamber housing part 44 at least partially surrounding the capsule seal. The discharge device is also of multi-part construction here, with a discharge device housing 31 having a discharge channel 19 or discharge channels 19 for the brewed beverage and having extraction-side piercing points 11, an extraction-side capsule seal 33 and extraction-side brewing chamber housing part 34. The injection-side brewing chamber housing part 44 and/or the extraction-side brewing chamber housing part 34 can also have—for example guided in a groove 45—a brewing chamber seal 81 which, in the closed state of the brewing chamber, bears against the other brewing module part in each case and thus seals off the brewing chamber from the outside. The multi-part construction of injector and/or discharge device may be advantageous in terms of manufacturing, but is not a prerequisite for the functioning of the invention.

The respective piercing points 11, 12 can be integrally formed on the actual respective brewing module part 31, 41 or, as explained in WO 2010/118544 with reference to FIGS. 19-24, can be present on a separate piercing part (plate) or otherwise designed in a suitable manner. Apart from the type of fastening, the piercing points and elements, to which the piercing points are fastened, can also be designed in accordance with WO 2010/118544.

Figure 3:
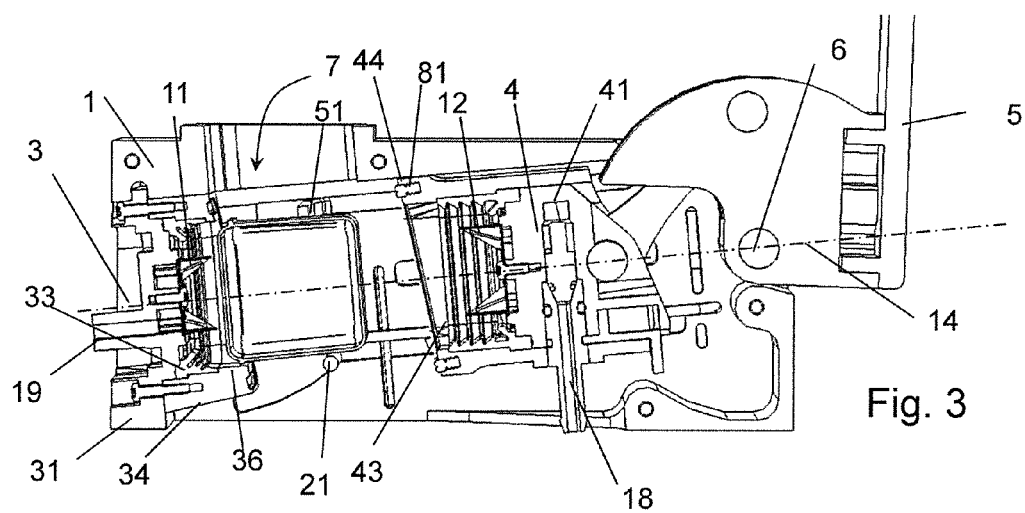
FIG. 3 is a sectional view of a portion of the brewing module, which is shown in sectioned form, in the open position.

The insertion opening 7 for inserting a cubic portion capsule 10 is readily visible in FIGS. 1 and 3. The insertion opening is formed in the outer housing 1, is located in the region of the discharge device 3 and, like the latter, remains stationary during a movement of the operating lever. The insertion opening can be slightly conical in a downwardly tapering manner in order thereby, during the insertion, to have a centering effect on the capsule without there being too great a risk of the capsule jamming.

Figure 6:
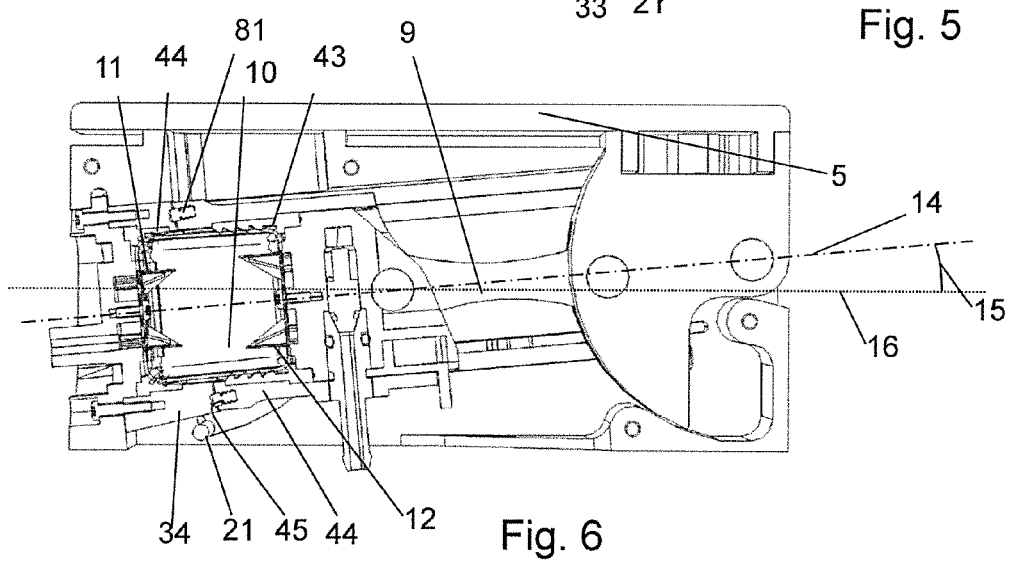

As is apparent in FIG. 3, the brewing module is designed in such a manner that the axial direction—the axis connecting injector and discharge device and along which the movable brewing module part (i.e. the injector here) is moved when the brewing chamber is opened and closed—is slightly inclined, for example by approx. 5°, in relation to the horizontal, specifically in such a manner that the movable brewing module part (i.e. the injector here) moves slightly downward when the brewing module part moves toward the positionally fixed brewing module part (i.e. the discharge device here). FIG. 6 also shows the axis of injector and discharge device 14, and also the angle 15 toward the horizontal 16; the axis of injector and discharge device substantially also corresponds to the axis of symmetry of the capsule or is parallel thereto.

As is likewise visible, for example, in FIG. 3, the brewing module furthermore has a support element 21. Together with a support projection 36 of the discharge device 3, the discharge device forms a support for the capsule inserted through the insertion opening 7.

Capsule take-off elements 51, the function and manner of action of which is explained in further detail below, are also seen in FIG. 3.

Figure 4:
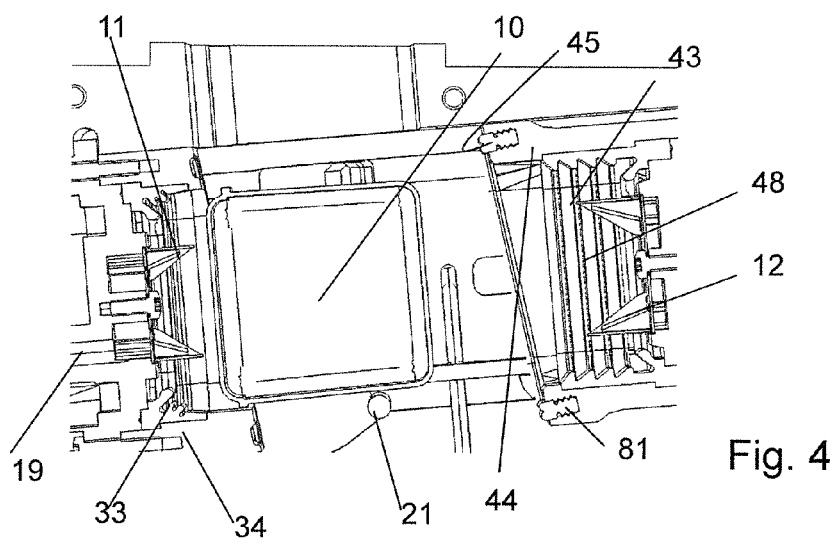
FIG. 4 is a sectional view of a detail of the open brewing module with a capsule inserted.

FIG. 4 illustrates a detail of the brewing module in the open state with a capsule 10 inserted. It is also seen that the insertion opening 7 and the discharge device 3 are positioned relative to each other in such a manner that the capsule comes to lie directly in front of the extraction-side piercing points 11, i.e. either already touches the latter or is at a distance of at most the height of a point therefrom.

Figure 5:
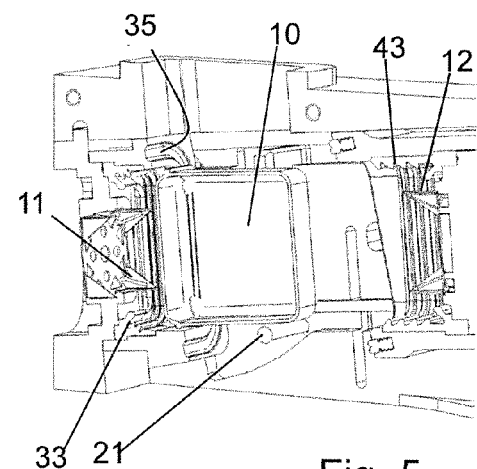
FIGS. 5 and 6 each are sectional views of the brewing module with capsule according to FIG. 4 in the open and in the closed state, respectively.

The extraction-side capsule seal 33 and the injector-side capsule seal 43 are also particularly readily seen in FIGS. 4 and 5. The injector-side capsule seal 43 has a plurality of consecutive sealing ribs 48 which are formed on the sealing collar and embrace the capsule in a sealing manner. All in all, the capsule seals 33, 43 can be designed in accordance with the teaching of PCT/CH2010/000249, to which reference is expressly made here.

When the brewing chamber is closed, the approach of the injector 4 causes the peripheral collar of the seal 43 of the capsule 10 to be brushed over, and the collar embraces the injector-side part of the peripheral capsule wall. The points of the perforation elements (piercing points 11, 12) then begin to puncture the injection-side and/or extraction-side capsule wall.

FIG. 6 illustrates the brewing chamber in the closed state of the brewing module. The brewing chamber housing parts 34, 44 of the discharge device and of the injector fit together in a precisely fitting manner. In the closed state, the peripheral, capsule-surrounding brewing chamber housing parts 34, 44 of the discharge device and of the injector adjoin each other and thereby close the brewing chamber. They form side walls (in the capsule form illustrated here) of the closed brewing chamber. For this purpose, there can also be a brewing chamber seal on the contact surface (on the end side). A two-stage sealing is thereby achieved. The brewing chamber seal can be fastened here to the injector or to the discharge device and can be pressed against a corresponding sealing surface of the other part in each case. It is often preferred if the seal is fastened to the injector, since the latter, in the open state, is at a retracted position and is therefore better protected.

Figure 7:
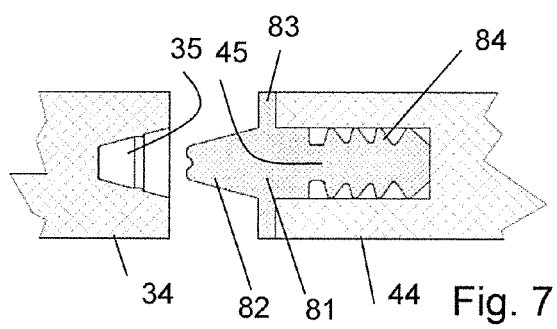
FIG. 7 is a sectional illustration of a first seal.
Figure 8:
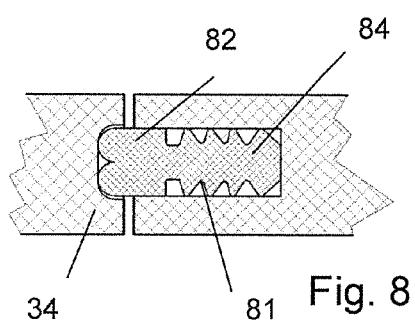
FIG. 8 is a sectional illustration of a second, alternative embodiment of a seal, wherein the brewing module is in the closed state.

FIGS. 7 and 8 illustrate two examples of such a sealing principle. The brewing chamber seal 81 according to FIG. 7 has an axially protruding lip 82 which engages in a corresponding groove 35 of the other brewing chamber part. In addition, it also forms a shoulder 83 which is pressed against the corresponding surface of the other brewing chamber part. A rear-side fastening portion 84 anchors the seal in the corresponding brewing chamber part. The brewing chamber seal according to FIG. 8 corresponds on the front side to the "square ring" principle with two sealing lips 82 which engage in a common, wide groove of the other brewing chamber part. Other sealing principles would also be conceivable, for example also with a single sealing lip or with a sealing bead, which sealing lip or sealing bead is pressed against a surface, for example in the form of an O ring—or correspondingly with a plurality of sealing lips/sealing beads.

Figure 9:
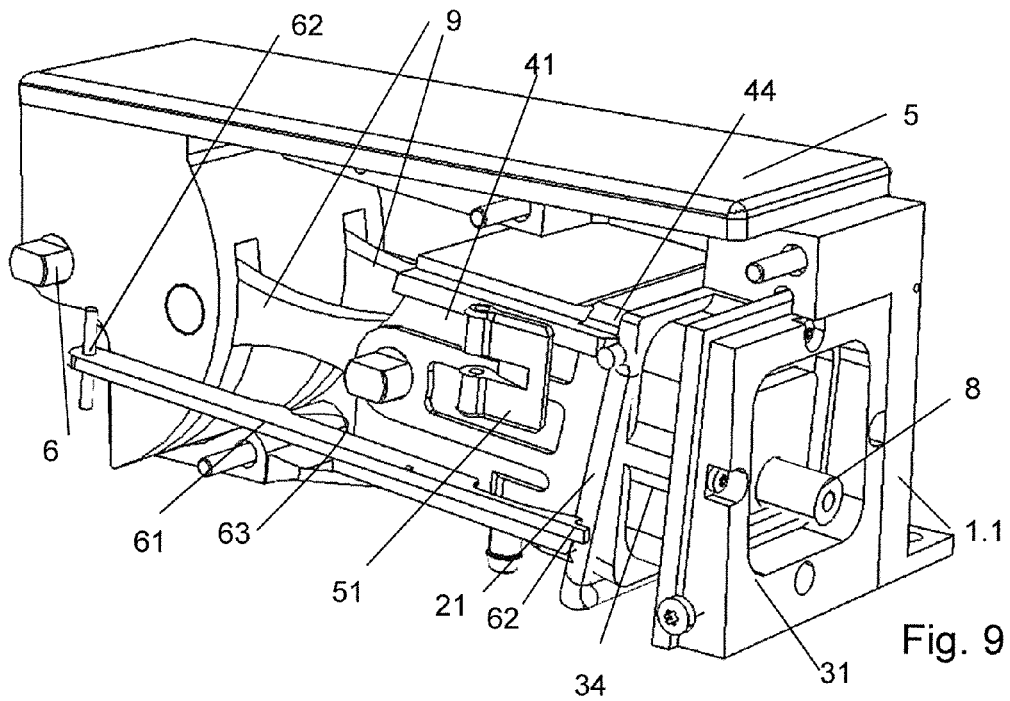
FIG. 9 is a view of parts of the brewing module in the closed state.

FIG. 9 is another view (not sectioned) in which, however, one of the two half shells of the outer housing 1 is not illustrated. In FIG. 9, the brewing chamber is closed. The capsule take-off elements 51 have been folded outward on both sides by the approaching injector, and the support element 21 has been displaced downward into the inoperative position. A retaining element 61 which is designed as a rod pivotable about an axis 62 fixed on the housing is in engagement at the extraction-side end thereof with the support element 21. When the brewing chamber is closed, the extraction-side end of the retaining element 61 was clipped onto the corresponding portion of the support element by way of a pivoting movement of the retaining element. When the brewing chamber is opened by pivoting of the operating lever 5, the injector is displaced in a translatory manner away from the discharge device (to the rear on the left in FIG. 9). As soon as the front edge of the injector is displaced behind the capsule take-off elements 51, the latter fold inward toward the capsule and clamp the latter against further retraction. The retaining element 61 simultaneously prevents the support element from pivoting back into the support position on account of the action of the spring(s) (not shown) holding it. The capsule can thus drop downward into the capsule container as soon as the brewing chamber is opened sufficiently far. Only when the brewing chamber is completely opened by movement of the operating lever virtually as far as a stop does the support element pass back again into the support position. This takes place in the embodiment illustrated by a (release) portion, which is provided for this purpose, of the injector being pressed against a ramp 63 of the retaining element 61 and thus pivoting the retaining element outward. The snap connection to the support element is released, and the latter pivots back upward into the support position on account of the spring force.

The two connecting rods 9 which convert the pivoting movement of the operating lever 5 into the linear movement of the injector 4 are readily visible in FIG. 9.

With reference to the following figures, the functioning of individual parts is explained in further detail with reference to a second embodiment of the brewing module. The second embodiment differs from the first embodiment firstly by the differing configuration (not discussed in more detail here) of the outer housing. Secondly, the mechanism of the operative connection between injector and support element is also released differently. Thirdly, individual elements, in particular the shape of the support element, are also configured differently than in the embodiment discussed above. It goes without saying that these differences can be implemented independently of one another. For example, the configuration of the mechanism releasing the support element does not depend on the shape and configuration of the individual parts, apart, of course, from the functionally required features which are explicitly discussed here.

Figure 10:
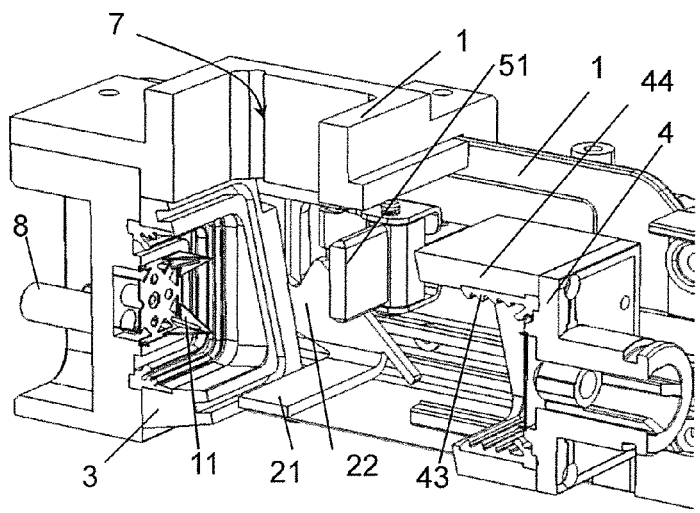
FIG. 10 is a sectional view of an alternative embodiment in the open state.
Figure 11:
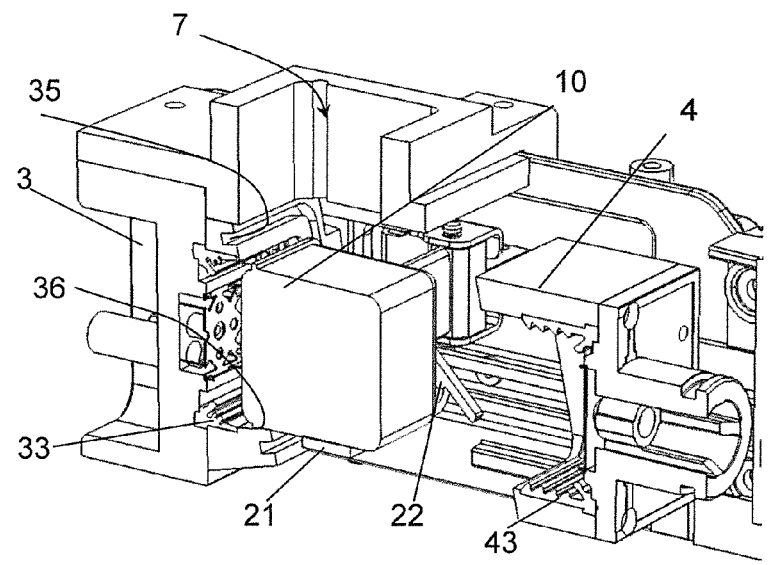
FIGS. 11 and 12 are sectional views of the embodiment according to FIG. 10 with a capsule inserted, in the open state and during the closing, respectively.
Figure 12:
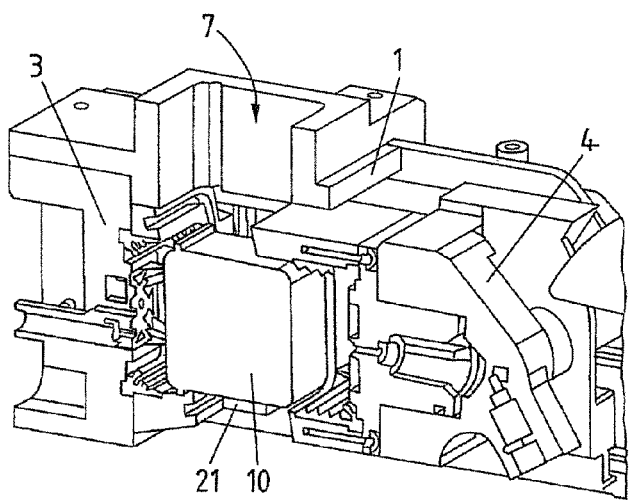
Figure 13:
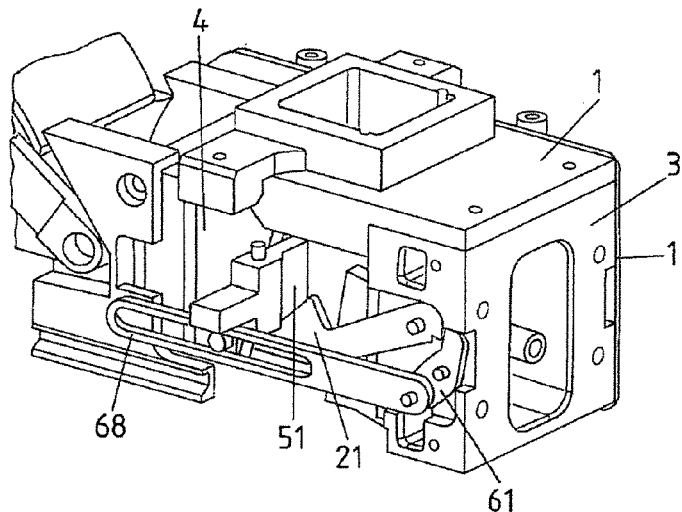
FIGS. 13, 14, 15, 16, 17, and 18 are views, from a different side, of the embodiment according to FIG. 10 in various states during the closing and subsequent opening of the brewing chamber.
Figure 14:
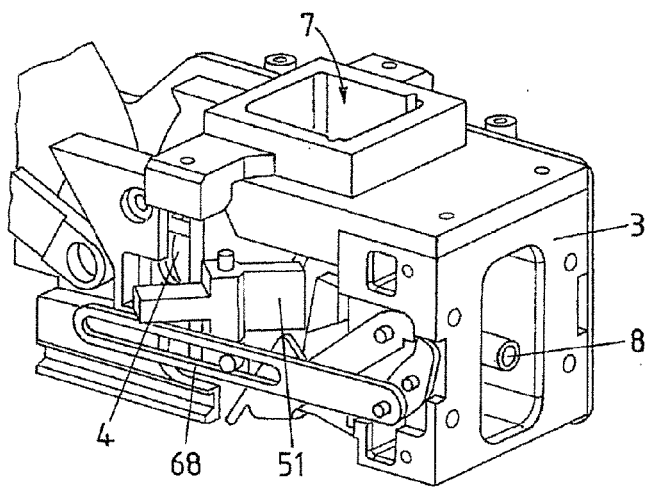

FIG. 10 illustrates the truncated alternative brewing module in a view without a capsule. The support element 21, which, in this configuration, has an optional, planar, lateral guide portion 22, and one of the take-off elements 51 are clearly visible. The support element 21 and the take-off elements 51 are in the position/orientation illustrated in FIG. 10 because of the action of associated springs. FIG. 11 shows the brewing module with a capsule 10 which is likewise illustrated in sectioned form and has been inserted through the insertion opening. The brewing chamber is closed in order to brew the beverage. For this purpose, the first brewing module part is displaced relative to the second brewing module part—for example likewise by actuation of an operating lever; the injector 4 is moved here in the direction of the discharge device 3. FIG. 12 shows the brewing module during the movement. FIG. 13, like the following figures, shows a view of the brewing module (not illustrated in sectioned form) from another side (rotated by approx. 180° about a vertical axis in comparison to the orientation according to FIG. 13), with parts of the outer housing being omitted. As before, the take-off elements 51 are in the non-pivoted starting position. The brewing chamber is virtually closed in FIG. 14 and completely closed in FIG. 15. The take-off elements 51 which are mounted pivotably about a vertical axis are pivoted away toward the extraction side and outward counter to the spring force by the approaching injector. An optional portion protruding outward over the pivot axis serves here for fastening the spring; there are also other solutions for this, for example the use of a spiral spring mounted coaxially with the pivot axis, a leaf spring, a helical spring fastened on the inside, etc.

Figure 15:
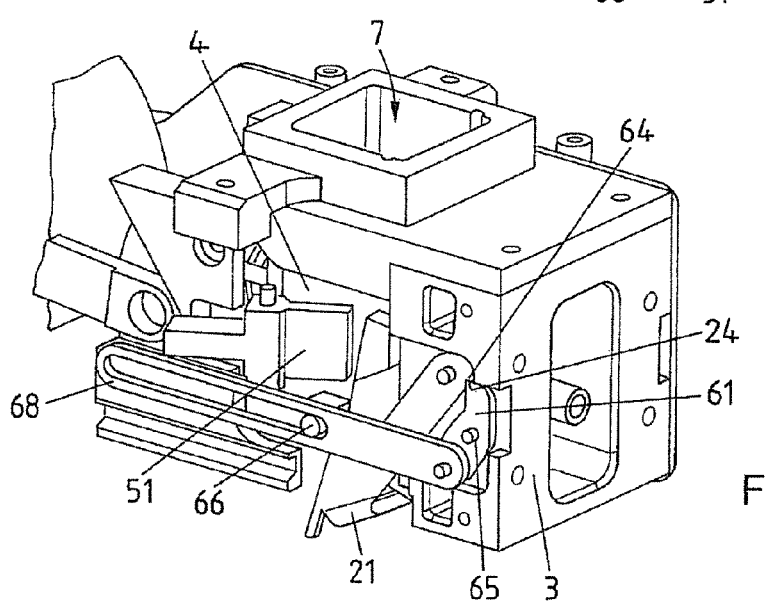

FIG. 15 illustrates how the support element has also been pivoted away by the approach of the injector, specifically downward and toward the extraction side. The retaining element 61 here is a plate which is pivotable about a retaining element rotary pin 65 and has a retention portion which latches into a correspondingly shaped receiving recess 24 of the support element 21 when the latter is pivoted into the inoperative position thereof. A correspondingly pretensioned spring pivots the retaining element into this orientation.

Figure 16:
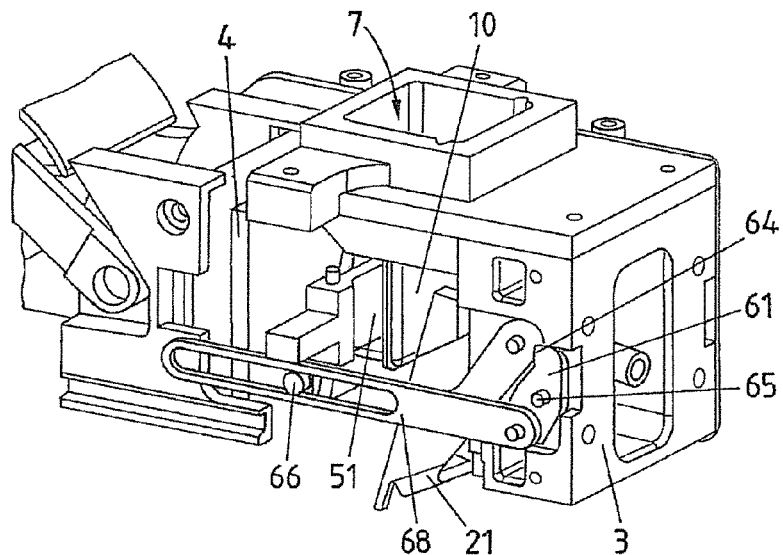

When the brewing chamber is opened, first of all, as is visible in FIG. 16, the support element 21 is held in the inoperative position by the retaining element 61 because the support element remains latched thereto. By the injector moving away, the take-off elements 51 can fold back inward because of the spring force and bear with the inside edge thereof against the capsule 10. During the further movement away of the injector, the take-off elements 51 hold the capsule back (FIG. 16) such that the capsule drops downward into the capsule container as soon as the injector no longer constitutes an adequate support for the capsule.

Figure 17:
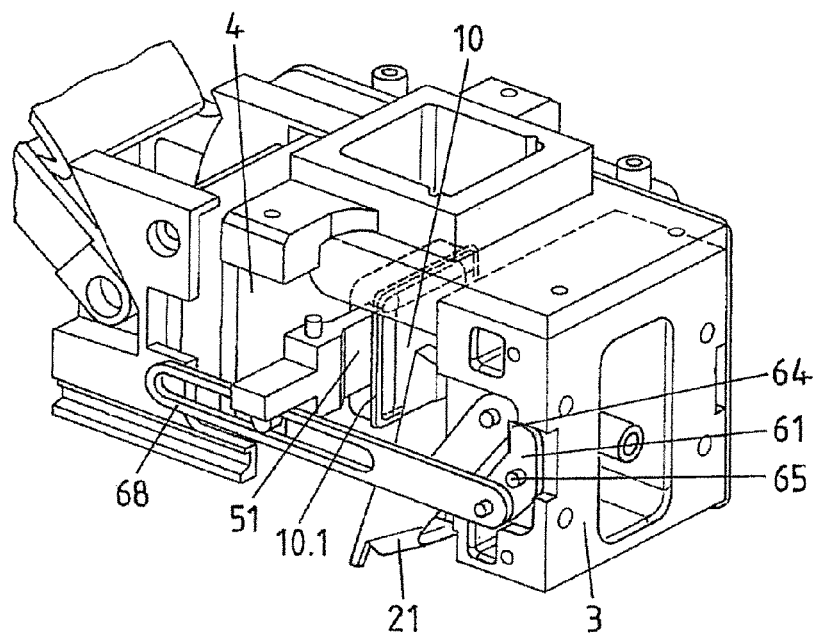

The retaining action of the take-off elements is based, in the variant illustrated in FIG. 16, on the combination of contact with a peripheral weld seam of the capsule (as is produced in the separating welding method, which is described in WO 2010/118543) and frictional forces. In the embodiment of FIGS. 1-6 and 9, the take-off elements are dimensioned in such a manner that, when in contact with the capsule, the take-off elements are not completely folded inward, but rather remain at an angle to the radial direction. Clamping thus (also) occurs, possibly in combination with contact with a reinforcement (weld seam; collar). Contact of the peripheral weld seam 10.1 with the take-off element is seen somewhat more clearly in FIG. 17.

Figure 18:
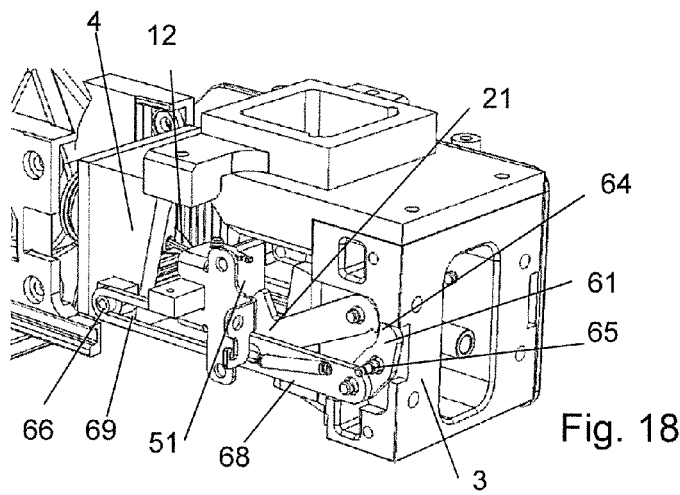

FIG. 18 illustrates the brewing module with the brewing chamber completely open. The capsule has dropped downward into the capsule container and is no longer visible. In the embodiment of FIGS. 11-19, the movement back of the support element 21 into the support position is released as follows. A release pin 66 which serves as the release portion and which is fastened to or formed on the injector is guided in an elongate recess (elongated hole) 69 of a release element 68. The release element 68 is connected at the one extraction-side end to the retaining element 61. When the brewing chamber is completely open, the release pin strikes against the injector-side end of the elongated hole 69 and pulls along the release element somewhat therewith such that the latter tilts the retaining element 61 counter to the spring force and thus releases the latching connection with the support element. The latter pivots back into the support position.

Figure 19:
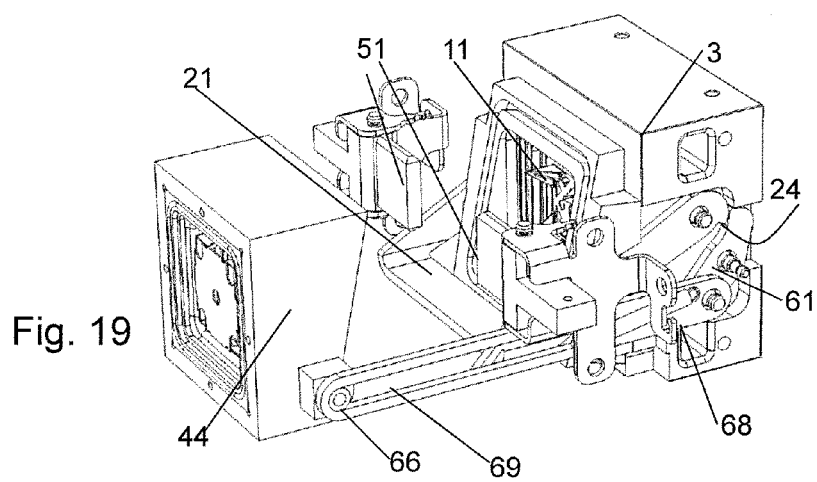
FIG. 19 is a view of elements of the embodiment of FIG. 10.

FIG. 19 also illustrates elements of the brewing module with an open brewing chamber, wherein the relative positioning of support element 21, take-off elements 51 and discharge device 3 are particularly readily visible.

Figure 20:
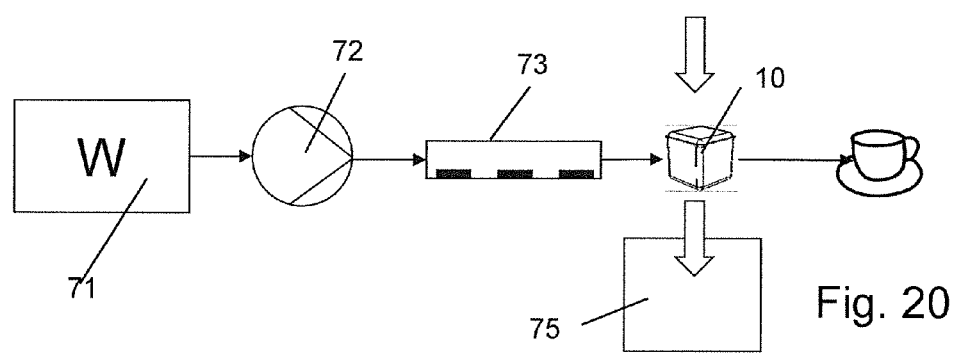
FIG. 20 is a schematical illustration of a coffee machine with a horizontal brewing module of the type described and defined in the present document.
Figure 21:
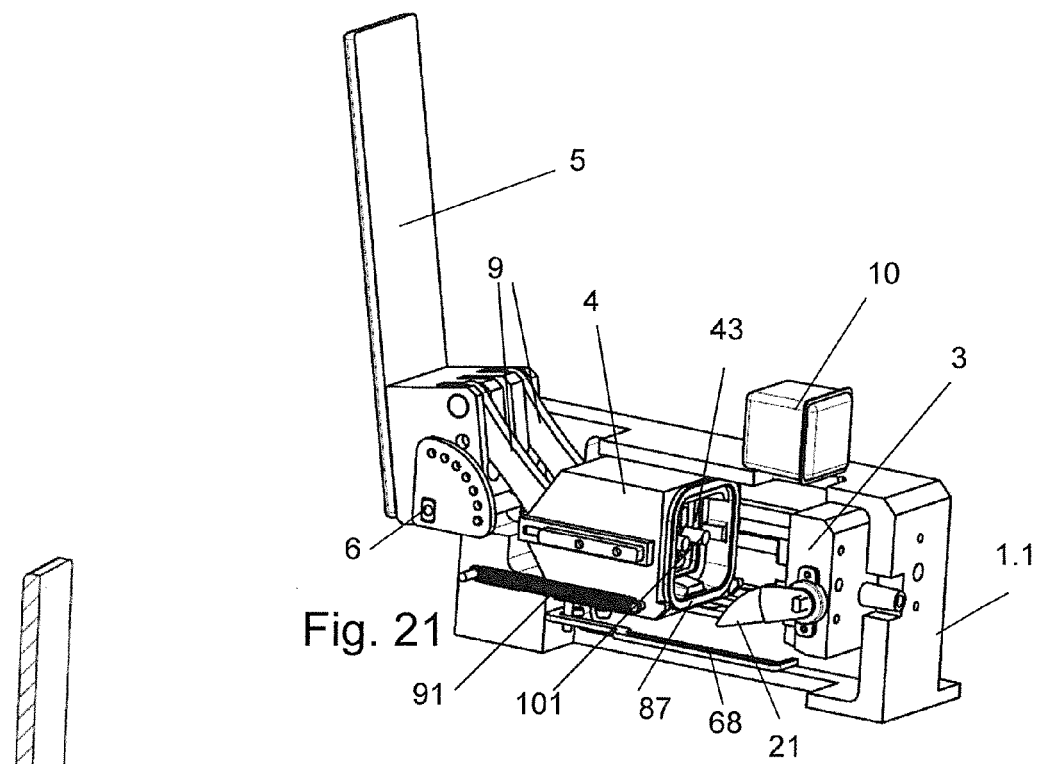
FIGS. 21 and 22 are a view (with housing parts removed) and a sectional view of a third embodiment of a brewing module, with a capsule which is to be inserted.

An extraction apparatus, in particular a coffee machine with a brewing module, as illustrated schematically in FIG. 20, in addition to the brewing module has a water tank 71, a pump 72 for supplying brewing water to the injector 4 and a water heating device 73 (for example, instantaneous water heater). A capsule container 75 into which the capsules drop or are transported after the brewing process is arranged below the brewing module.

The heated water is supplied to the injector 4 via flexible water line sections (tubes) and via supply channels. The coffee machine furthermore has, for example, a capsule container 75 which is arranged below the brewing chamber, into which the capsule is automatically expelled after the brewing operation by raising of the operating lever 5.

A further embodiment of a brewing module—for example for a coffee machine according to FIG. 20—is illustrated in FIGS. 21-33. The description below relates in particular to the difference from the embodiment of FIGS. 1-9. These features, by way of which the third embodiment differs from the first two embodiments, act independently of one another even though the advantages thereof complement one another in a favorable manner. The features can therefore be realized individually or (as in the described embodiment) in combinations or in any subcombinations:

A brewing module resetting spring 91 (or a respective resetting spring mounted on both sides of the injector 4) is tensioned by the closure of the brewing chamber. As a result, the resetting spring exerts a resetting force which facilitates the actuation during the re-opening. The brewing module resetting spring 91 is illustrated in its entirety in FIG. 21, but only the two ends of the spring are illustrated in the following figures.

The brewing module does not have an extraction-side elastomeric capsule seal. Rather, there is sealing on the extraction side by the fact that the capsule interior is pressurized during the brewing process and the capsule wall becomes soft, as a result of which the capsule wall is pressed in a planar manner against the corresponding surface of the discharge device. The brewed beverage discharged from the capsule can flow to an exit from the extraction apparatus; therefore, there is no (at least not any substantial) pressure difference between the brewed beverage which has emerged from the capsule and the atmospheric pressure. That is to say, the discharged brewing liquid is no longer pressurized. For this reason, the planar contact of the capsule wall with the corresponding surface of the discharge device is sufficient for an adequate sealing effect on account of the internal pressure of the capsule.

The brewing module does not have any take-off elements according to the second aspect of the invention. On the contrary, the capsule is ejected after the brewing process. This takes place by way of ejectors 101 which are axially displaceable relative to the injector 4 in the manner of pistons, and the ends of which, when the brewing chamber is opened, are pushed into the brewing chamber interior relative to the injector 4 such that they eject the capsule. The mechanism for the actuation is described in further detail below.

The support element 21 has lateral guides 120 which protrude upward on both sides from the support surface. In the embodiment shown, the guides have a slightly pyramidal configuration, and therefore the receptacle for the capsule tapers downward slightly conically, which centers the capsule with respect to lateral directions during the insertion (see FIG. 24).

Figure 31:
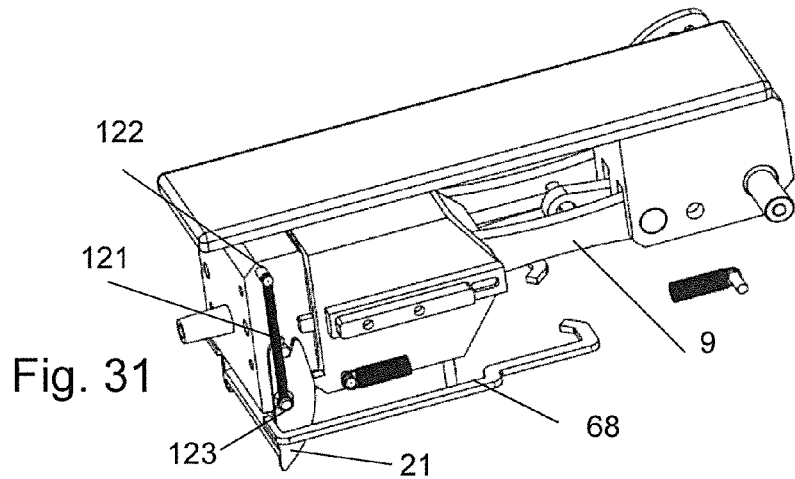
FIG. 31 is a further view of elements of the brewing module in the closed state.
Figure 32:
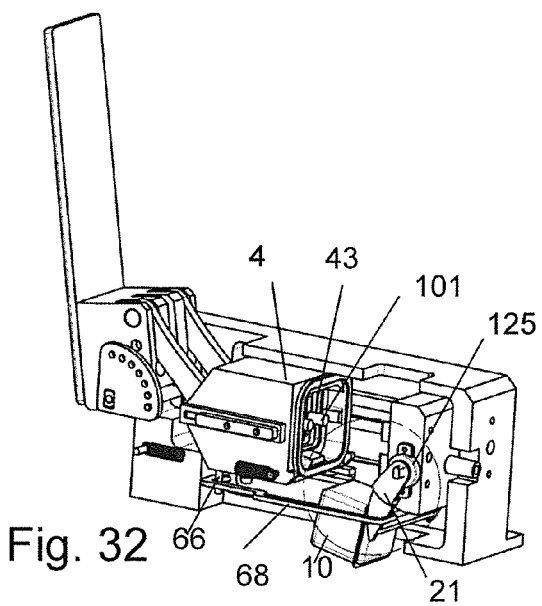
FIG. 32 illustrates the brewing module in the third embodiment thereof during the opening.
Figure 33:
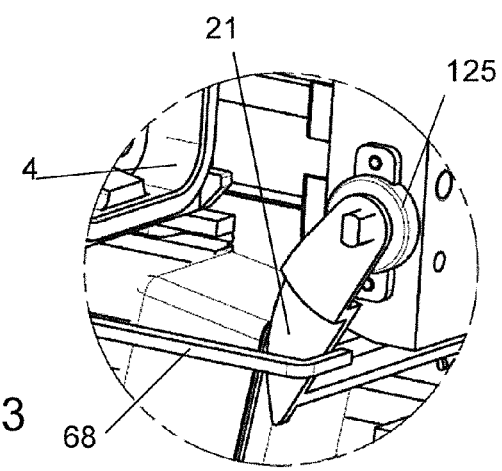
FIG. 33 is a detailed view of FIG. 32.

The support element 21 is held in the support position and the inoperative position—in each case in contact with a stop—by a spring 121, wherein the spring is moved over and beyond a dead center by the movement from the support position into the inoperative position. As a result, a separate retaining element can be omitted. The spring here is a tension spring which is fastened above the support element to the housing of the discharge device 3 and to the discharge device (fastening pins 122, 123) and is arranged such that the fastening point on the support element is moved axially beyond the location of the fastening to the discharge device (exceeding of the dead center) when the brewing chamber is closed. This mechanism is best seen in FIG. 31. The release element 68 can then be formed, as in the present case, as a simple bow which is carried along by a carry-along portion 66 (pin) of the moving brewing module part, when the brewing module is opened, and retracts the support element 21 over the dead center.

The support element is provided with a rotation damper 125 which ensures a slow movement back instead of snapping back.

The support projection 36 of the discharge device protrudes beyond the brewing chamber seal 81 in the direction of the injection side (or if the brewing chamber seal is mounted on the injection side, over the surface with which the brewing chamber seal is in contact). This makes it possible for the seal to be arranged approximately vertically and does not have to run, as in the above embodiments, along an inclined plane so that nothing stands in the way of the insertion of the capsule. The brewing chamber seal is designed here as an elastomeric surface seal.

The brewing module is equipped with a fine adjustment mechanism which, despite existing manufacturing tolerances and also when an elastomeric surface seal is used, permits precise closure of the brewing chamber. This mechanism makes provision for the rotary pin 6 not to be formed and/or mounted in a rotationally symmetrical manner about the axis thereof, but rather, for example, to be eccentric or elliptical. By rotation of an adjustment plate 111 (see, for example, FIG. 23), the latter can be rotated relative to the operating lever 5 and can then be fixed relative to the operating lever for rotation therewith by way of a pin through one of a plurality of adjustment holes 112 (the same principle could also be applied to the orientation of the rotary pin 6 relative to the housing). During the final assembly of the brewing module, the brewing chamber is closed and the adjustment plate 111 is fixed in the state in which the brewing chamber seal 81 is fully in contact with the counter surface. The rotary pin here is a shaft which is not rotationally symmetrical about the axis thereof at least either in the region where the shaft is in engagement with the operating lever or wherever the shaft interacts with a part fixed on the housing.

The last-mentioned principle of the fine adjustment mechanism with a rotary pin which is not rotationally symmetrical and/or with a rotary pin mounting which is not rotationally symmetrical can be realized in general in brewing modules according to the preamble of the first patent claim independently of the concepts of the first and second aspect.

FIGS. 21-24 illustrate the brewing module or parts thereof in the open state when the capsule is inserted. In this state, the ejector 101 protrudes into the space which is formed by the injection-side seal 43 and, in the closed state, will form the brewing chamber. The capsule, on being inserted, is centered and positioned by the lateral guides.

Figure 22:
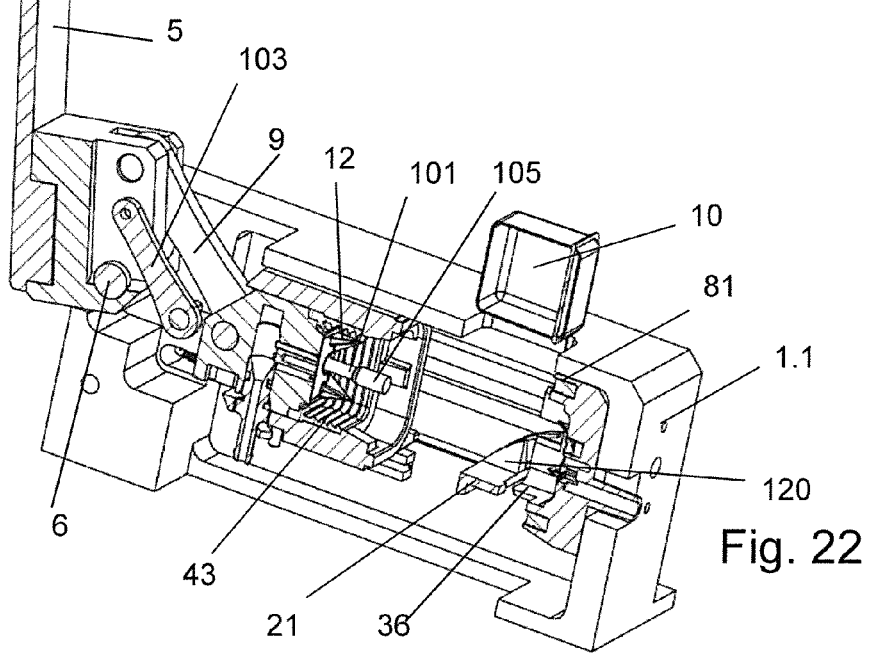
Figure 23:
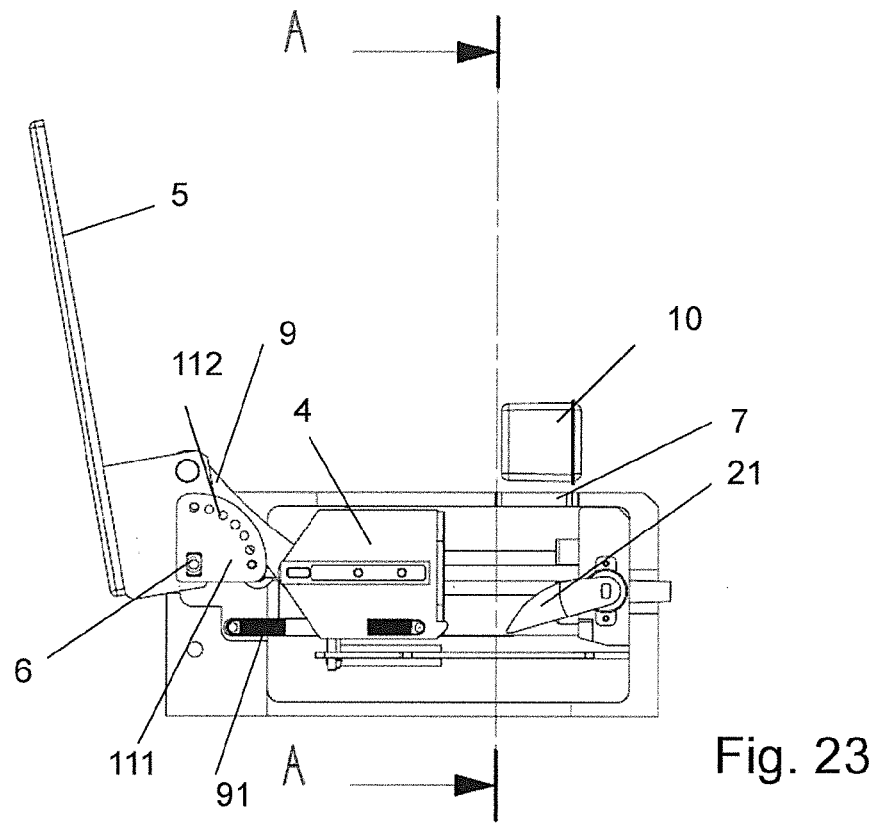
FIG. 23 is a further view of the third embodiment without parts of the housing.
Figure 24:
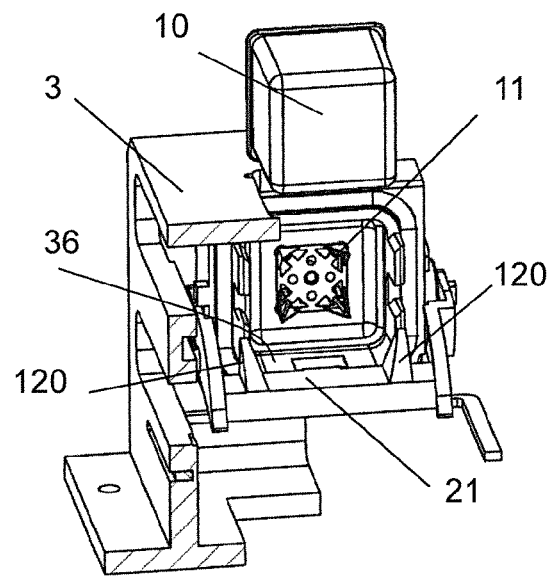
FIG. 24 is the view of those parts of the brewing module which are sectioned along the plane A-A in FIG. 23.

As illustrated in FIG. 22, in addition to the connecting rods 9 for converting the pivoting movement of the operating lever 5 into an axial movement of the injector 4, there is also an ejector connecting rod 103. The latter is fastened to the operating lever 5 at a point located closer to the pivot axis (defined by the pivot pin 6) than the fastening point of the connecting rods 9. As a result, during a pivoting movement of the operating lever, the ejectors 101 are likewise moved in the direction of movement of the injector, but more slowly and therefore ultimately by a shorter distance.

Figure 25:
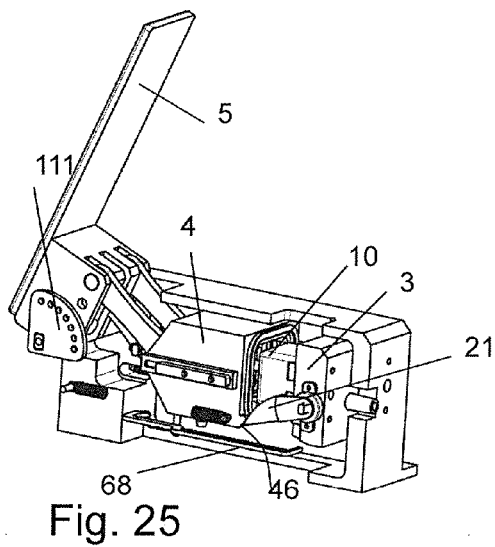
FIGS. 25, 26, and 27 are views corresponding to the illustration from FIG. 21 in different positions during the closing operation.
Figure 26:
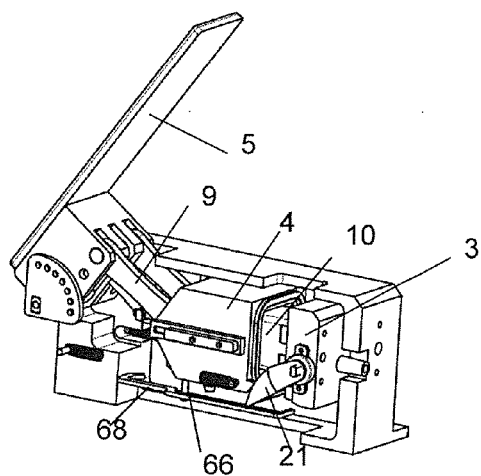
Figure 27:
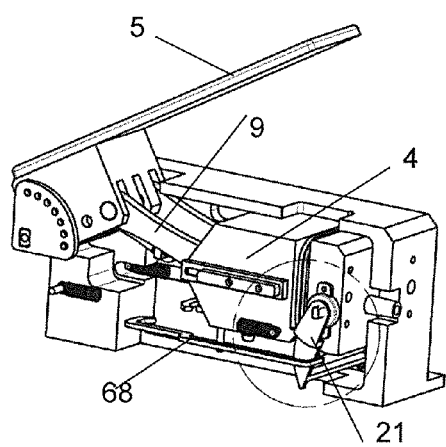
Figure 29:
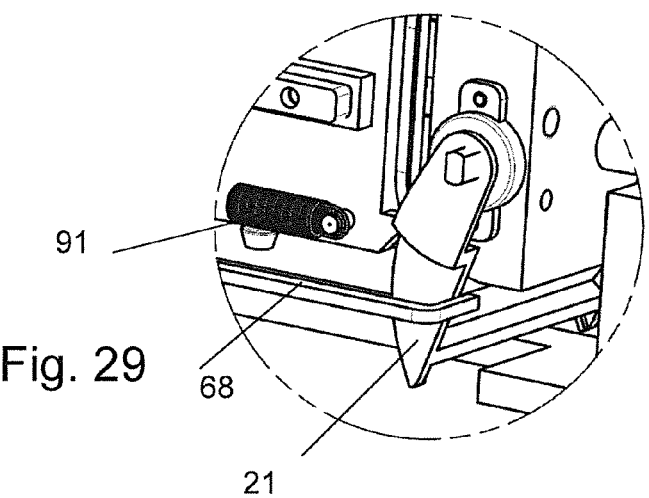
FIG. 29 is a detailed view of FIG. 27.
Figure 30:
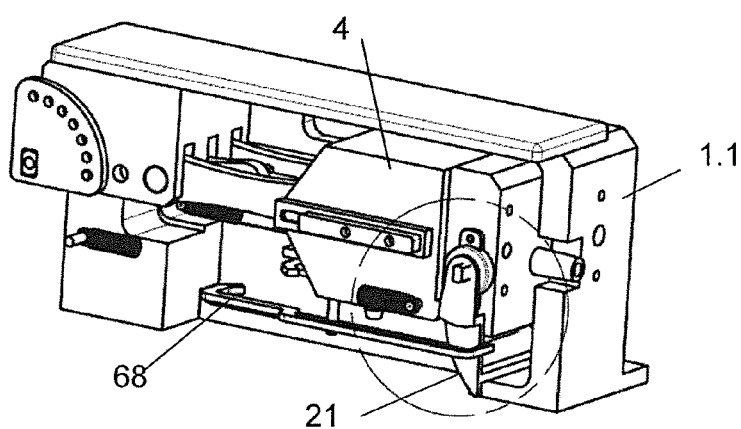
FIG. 30 illustrates the brewing module in the third embodiment thereof in the closed state.

FIGS. 25-27 illustrate the brewing module in continuing stages of the closing operation. It is seen how a ramp-like actuating surface 46 of the injector pushes the support element 21 away from the support position. The retaining element 68 is freely movable axially and, if required, is carried along at the same time (FIG. 27, FIG. 29).

The geometry of the arrangement is selected in such a manner that, in the closed state, the ejectors 101 are retracted entirely out of the brewing chamber. In the exemplary embodiment shown here, the front sides of the ejectors (see FIG. 22) have a head portion 105 with a somewhat enlarged diameter, and, on the rear side of the ejectors, there can be a peripheral seal (not shown in the figures) which, in the state of the ejectors in which they are retracted relative to the injector 4, is pressed against a shoulder arranged in the interior of the injector and thereby provides a seal.

Figure 28:
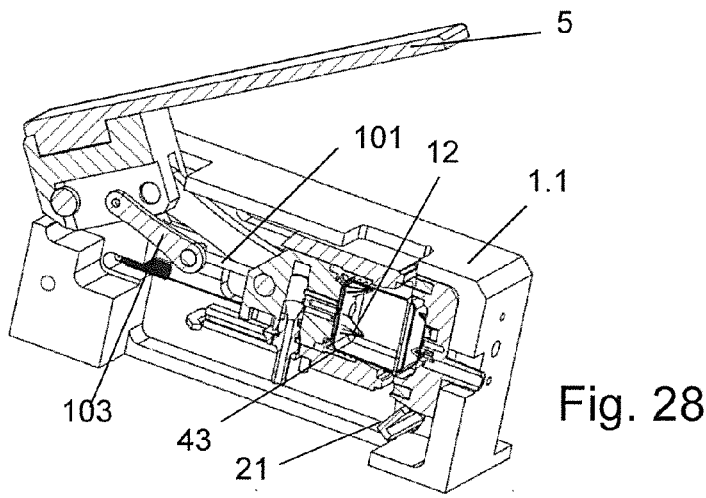
FIG. 28 is a sectional view in the position according to FIG. 27.

It is seen in FIG. 28 how, when the brewing chamber is closed, the capsule is pierced at least on the injection side by the piercing points 12.

In the closed state (FIGS. 30 and 31), the support element is held in the inoperative position by the spring 121 on account of the above-described mechanism while the brewing operation can take place.

When the brewing chamber is opened (FIGS. 32 and 33), the capsule is first of all ejected from the injector-side capsule seal 43 embracing the capsule by the ejector 101 being retracted by a shorter distance than the injector and thus being displaced relative to the latter into the brewing chamber. The ejectors are dimensioned in such a manner and the ejector connecting rod 103 is arranged in such a manner that the capsule is entirely released from the injector-side capsule 43 and drops downward before the brewing module is completely opened. Only at the end of the opening movement will the carry-along pin 66 of the injector carry along the release element (bow) 68 and retract the support element over the dead center, whereupon the spring 121 moves the support element back into the support position. The rotation damper 125 prevents an immediate springing back into the support position, as a result of which it is ensured, even in the case of very rapid opening of the brewing module, the support element cannot be back in the support position before the capsule has dropped downward.

Figure 34:
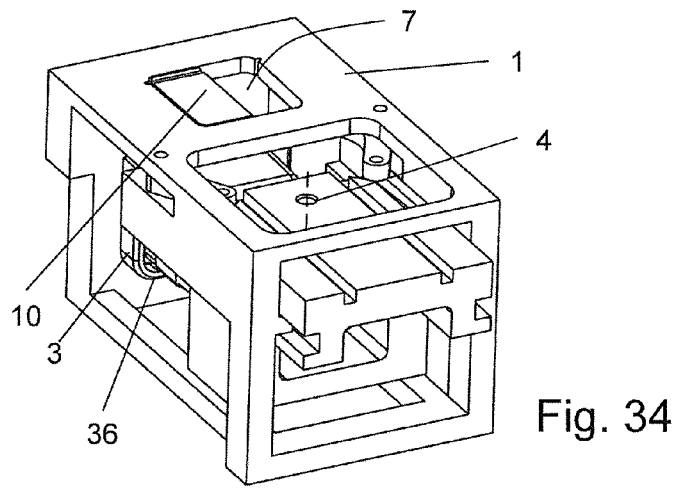
FIGS. 34, 35, and 36 are views of a fourth embodiment of the brewing module in the open state.
Figure 35:
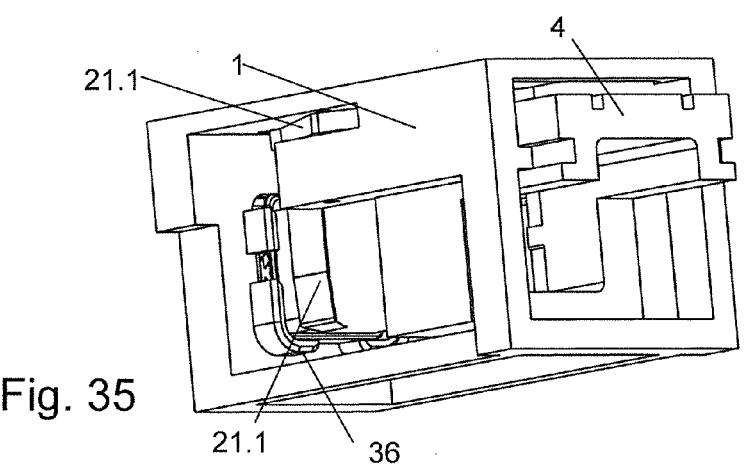
Figure 36:
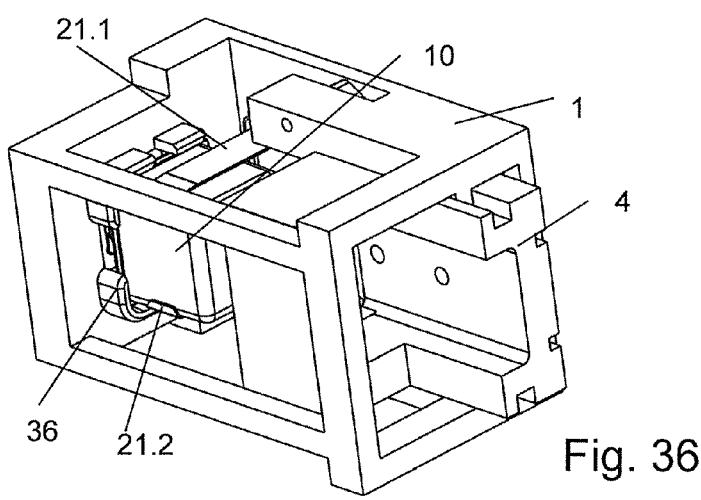

FIGS. 34-39 illustrate an embodiment of a brewing module (illustrated without operating lever and ejection/expelling mechanism), in which the support element 21 is in two parts. It has a first support element part 21.1 and a second support element part 21.2. FIGS. 34-36 show the brewing module in the open state of the brewing chamber, in which the capsule can be inserted or is inserted. In FIG. 35 and in particular in the view according to FIG. 36, which illustrates the brewing module tipped onto the side, it is seen how the support element parts 21.1, 21.2 are designed as bows which run at the side of the capsule and have an end portion engaging under the capsule.

Figure 37:
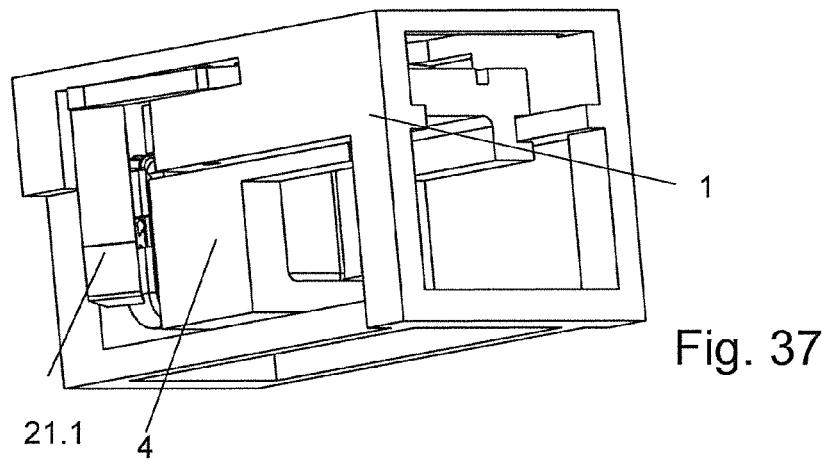
FIG. 37 is a view of this embodiment in the closed state.
Figure 38:
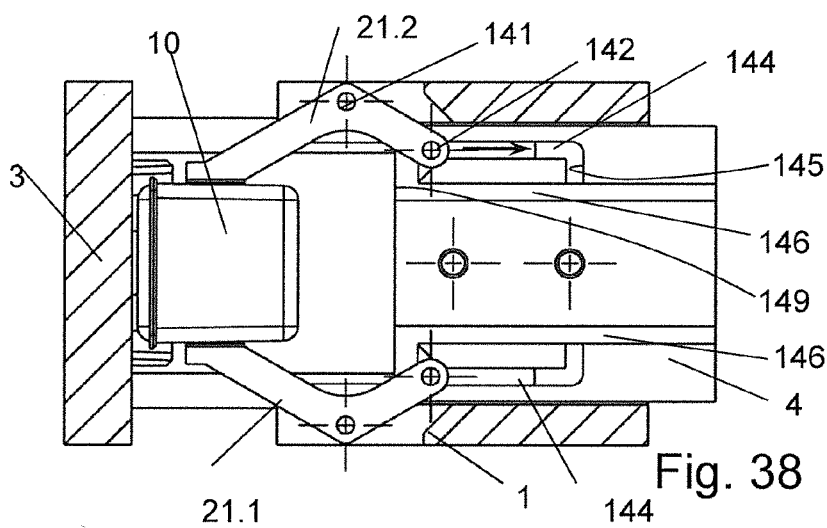
FIGS. 38 and 39 each are a sectional illustration of the brewing module, which is sectioned along a horizontal plane above the brewing chamber, in the fourth embodiment, during the closing and during the opening of the brewing chamber, respectively.
Figure 39:
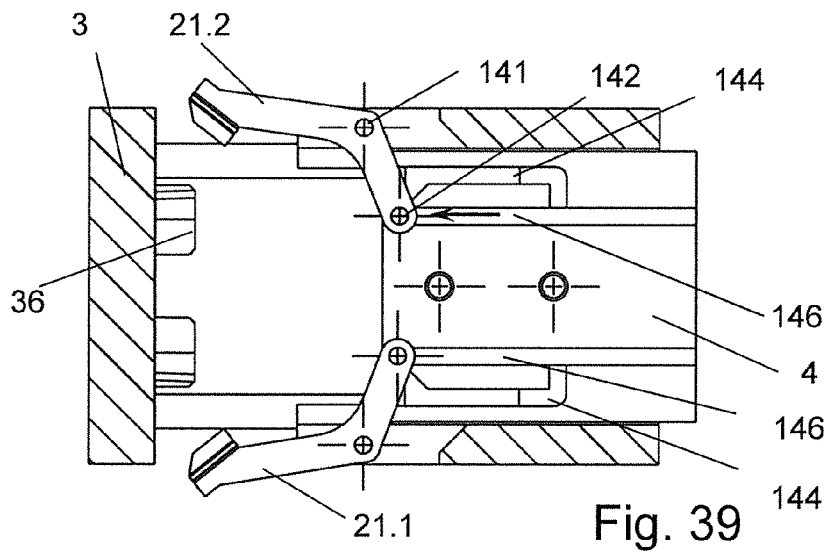

FIG. 37 illustrates the brewing module in the closed state of the brewing chamber, in which the support element is in the inoperative position thereof by the two support element parts being pivoted away outward. For this purpose, in addition to the bow which runs at the side of the capsule and has an end portion, the support element parts also have a pivot lever portion which is substantially horizontal here. As is particularly readily seen in FIGS. 38 and 39, the pivot lever portions are fastened pivotably to the housing 1 by a pivot pin 141 fixed on the housing.

The movement of the support element parts 21.1, 21.2 is brought about by the guidance of a guide pin 142 in a slotted guide of the second brewing module part (of the injector 4). For each of the two support element parts, a slotted guide is present here in each case in a mirror-inverted arrangement. The slotted guides comprise an outer guide groove 144 and an inner guide groove 146.

When the brewing chamber is closed (FIG. 38, by displacement of the injector 4 to the left in the figure), the guide pin 142 is guided in the outer guide groove 144 and the corresponding support element part 21.1, 21.2 is thereby held in the support position. Toward the end of the closing movement, the injector will strike against the support element parts, with the guide pin at the same time being able to be in contact with a first stop 145 of the slotted guide. However, as is visible in FIG. 38, the profile of the slotted guide permits the guide pin 142 to deviate inward at this point, as a result of which the support element parts 21.1, 21.2 are pivoted away outward.

When the brewing chamber is reopened (FIG. 39; injector 4 is displaced back to the right), the guide pin will remain in the inner guide groove 146 until the guide pin is in contact with a second stop 149. By the further retraction of the injector 4, the guide pin is carried along "rearward" (i.e. toward the injector side), which causes the support element part 21.1, 21.2 to pivot inward with the guide pin 142 at the same time sliding outward. The brewing module is again ready for an insertion of a capsule, and, on closure again, the guide pin is again guided, according to FIG. 38, in the outer guide groove 144.

The embodiment of FIGS. 34-39 is at the same time also an example of a brewing module in which the support element can be moved without a spring.

By way of the pivotability of the support element parts toward the side, this embodiment also permits a relatively tight lateral guidance of the capsule without interfering frictional forces occurring when the brewing chamber is opened.

The features of the support element and of the corresponding actuating mechanism, which features are described with reference to the embodiments, and the features of the take-off elements and of the corresponding mechanism can be implemented independently of one another and varied, with embodiments having a direct connection between the elements also being conceivable. An interaction between support element and take-off elements exists by the fact that the support element should possibly preferably be in the inoperative position when the take-off elements come into contact with the capsule.

The invention claimed is:

1. A brewing module for an extraction apparatus for preparing portions of a beverage or another extraction product from an extraction material packaged in a capsule, comprising a first brewing module part and a second brewing module part which is movable relative thereto, wherein the first and the second brewing module part form a discharge device for discharging an extraction product from the capsule and an injector for introducing an extraction liquid into the in capsule, and a brewing chamber which at least partially surrounds the capsule during the brewing operation and which can be brought from an open into a closed state by movement of the second brewing module part relative to the first brewing module part, wherein the first and/or the second brewing module part has piercing points for piercing the capsule by puncturing a capsule wall, wherein a support element which, when the brewing chamber is in the open state, forms a base for the capsule in a support position and which, by closure of the brewing chamber, is movable away from the support position into an inoperative position, wherein the movement of the support element from the support position into the inoperative position takes place in a direction different from the direction of movement of the second brewing module part relative to the first brewing module part, and wherein the brewing module is designed in such a manner that, after insertion via a defined insertion position, the capsule rests on the support element and a support portion of the first brewing module part, said support element and support portion together forming a support which supports the center of gravity of the capsule.

2. The brewing module as claimed in claim 1, wherein the support element is moved downward during the movement from the support position into the inoperative position.

3. The brewing module as claimed in claim 1, wherein the second brewing module part has a gripping element that embraces the capsule when the brewing chamber is closed.

4. The brewing module as claimed in claim 3, wherein the gripping element is formed by a rubber-elastic and/or elastomeric capsule seal with a peripheral sealing collar.

5. The brewing module as claimed in claim 1, wherein the support element interacts with the brewing module parts in such a manner that, when the brewing chamber is opened, said support element is moved back into the support position only when the brewing chamber is opened to a predetermined extent, wherein said extent is selected in such a manner that the brewing chamber is opened further when the support element moves into the support position during the opening operation than when the support element moves away from the support position during the closing operation.

6. The brewing module as claimed in claim 5, wherein the support element is movable away from the support position counter to a spring force, and wherein said support element is moved beyond a dead center of the spring force during the movement into the inoperative position.

7. The brewing module as claimed in claim 1, wherein, when the brewing chamber is closed, the support element is moved into the inoperative position counter to a spring force and is held there by a latching connection, the latching connection being releasable by opening of the brewing chamber.

8. The brewing module as claimed in claim 7, wherein the latching connection is between the support element and a movably mounted retaining element, and wherein said latching connection is releasable by a release portion of the second brewing module part.

9. The brewing module as claimed in claim 1, wherein at least one capsule take-off member which, when the brewing chamber is opened, automatically comes into engagement with the capsule and prevents the capsule from being moved together with the second brewing module part until the brewing chamber is completely open.

10. The brewing module as claimed in claim 9, wherein the capsule take-off member has parts which protrude radially inward from the sides and can be folded over away from the second brewing module part and outward counter to a spring force.

11. The brewing module as claimed in claim 1, further comprising at least one ejector that is mounted in an axially displaceable manner relatively in the second brewing module part or in the first brewing module part and, when the brewing chamber is opened, can be pushed in the direction of the brewing chamber interior relative to the second or first brewing module part.

12. The brewing module as claimed in claim 11, wherein the second brewing module part is displaceable relative to the first brewing module part by an operating lever, and wherein the ejector is mounted in an axially displaceable manner in the second brewing module part, wherein the ejector is operatively connected to an ejector connecting rod that is connected at a point to the operating lever which is closer to an axis of rotation of the operating lever than a connecting rod that is operatively connected to the second brewing module part.

13. The brewing module as claimed in claim 1, wherein the first brewing module part and the second brewing module part form a brewing chamber that completely surrounds the capsule, and in that there is a brewing chamber seal between mutually adjoining brewing chamber wall parts of the first and of the second brewing module part.

14. The brewing module as claimed in claim 1, wherein the support element has lateral guides protruding upward from a support surface.

15. The brewing module as claimed in claim 1, wherein, for opening and closing of the brewing chamber, an operating lever is mounted pivotably about a rotary pin which, at least in regions, is not rotationally symmetrical about the axis thereof, and in that the relative orientation of the rotary pin with respect to the operating lever or with respect to a brewing module housing can be fixed for adjustment purposes.

16. The brewing module as claimed claim 1, wherein the support element has at least two support element parts that are movable in the same or different directions.

17. The brewing module as claimed in claim 16, wherein the support element parts or two of the support element parts are pivotable toward a side in opposed directions in each case.

18. The brewing module as claimed in claim 17, wherein the support element parts each have a bow that runs at the side of the capsule and has an end portion engaging under the capsule from the side.

19. The brewing module as claimed in claim 1, further comprising a slotted guide mechanism for guiding a guided element of the support element.

20. The brewing module as claimed in claim 19, wherein the slotted guide mechanism has a first guide groove and a second guide groove running parallel to the first guide groove, wherein the support element is in the support position when the guided element is guided in the first guide groove and is in the inoperative position when the guided element is guided in the second guide groove.

21. The brewing module as claimed in claim 20, wherein said brewing module is designed in such a manner that the guided element is guided in the first guide groove while the second brewing module part is moved relative to the first brewing module part into the closed position, and is guided in the second guide groove while the second brewing module part is moved from the closed state into the open state.

22. An extraction apparatus, for preparing portions of a beverage or another extraction product from an extraction material packaged in a capsule, comprising a liquid tank, a liquid pump, a liquid heating device and a brewing module as claimed in claim 1, wherein liquid that is delivered by the liquid pump and is heated by the liquid heating device can be injected into a capsule by the injector of the brewing module.

23. A method for preparing a brewed beverage, comprising the following steps:

inserting a portion capsule with an extraction material into an open chamber of a brewing module such that said portion capsule at least partially rests on a support element, which is in a support position, and at the same time on a support portion of a first brewing module part, closing the brewing chamber by movement of a second brewing module part relative to the first brewing module part in such a manner that, by a movement in a direction different from the direction of movement of the second brewing module part relative to the first brewing module part, the support element is moved away from the support position into an inoperative position and the capsule is pierced at least by piercing points of an injector formed by the first and/or the second brewing module part, as a result of which introducing openings arise in the capsule;

introducing an extraction liquid into the capsule through the introducing openings;

discharging the extraction liquid from the capsule via discharge openings which are produced by piercing points, which piercing points belong to a discharge device formed by the first and/or the second brewing module part;

subsequent to the discharging, opening the brewing chamber by movement of the second brewing module part relative to the first brewing module part until the capsule drops downward out of the open brewing chamber; and continuing the opening of the brewing chamber until the movement back of the support element into the support position is brought about.

24. The method as claimed in claim 23, wherein, during the step of opening the brewing chamber, first of all the capsule is held by a holding member of the second brewing module part and moved together therewith, and subsequently at least one take-off element comes into engagement with the capsule, which take-off means prevents a further movement of the capsule together with the second brewing module part and thus releases the capsule from the holding means.

* * * * *